US008869630B2

(12) United States Patent
Watson et al.

(10) Patent No.: US 8,869,630 B2
(45) Date of Patent: Oct. 28, 2014

(54) TORQUE MEASURING VISE AND NOTIFICATION SYSTEM AND METHOD OF USING SAME

(71) Applicants: Brock Watson, Oklahoma City, OK (US); Greg A. Kliewer, Edmond, OK (US); Roger L. Schultz, Ninnekah, OK (US); Robert G. Watson, Baird, TX (US)

(72) Inventors: Brock Watson, Oklahoma City, OK (US); Greg A. Kliewer, Edmond, OK (US); Roger L. Schultz, Ninnekah, OK (US); Robert G. Watson, Baird, TX (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 0 days.

(21) Appl. No.: 13/743,159

(22) Filed: Jan. 16, 2013

(65) Prior Publication Data
US 2014/0196548 A1 Jul. 17, 2014

(51) Int. Cl.
G01F 1/66 (2006.01)
G01L 3/02 (2006.01)
B25B 1/24 (2006.01)
B25B 5/00 (2006.01)

(52) U.S. Cl.
CPC ............... *G01L 3/02* (2013.01); *B25B 1/2484* (2013.01); *B25B 5/006* (2013.01)
USPC .................................. 73/862.21; 73/862.191

(58) Field of Classification Search
USPC ................. 73/862.191, 862.21, 860
See application file for complete search history.

(56) References Cited

U.S. PATENT DOCUMENTS

| | | | | |
|---|---|---|---|---|
| 5,347,871 | A | * | 9/1994 | D'Andrea et al. .............. 73/775 |
| 5,546,817 | A | * | 8/1996 | Heiman .................... 73/862.333 |
| 6,276,243 | B1 | * | 8/2001 | Jenkins ........................... 81/479 |
| 7,819,025 | B2 | * | 10/2010 | Coffland .................... 73/862.21 |
| 8,172,607 | B2 | * | 5/2012 | Chiapuzzi ..................... 439/577 |
| 8,413,525 | B1 | * | 4/2013 | Schultz et al. ............ 73/862.338 |
| 2005/0223857 | A1 | * | 10/2005 | Reynertson et al. ............ 81/479 |
| 2006/0027058 | A1 | * | 2/2006 | Hsien ............................... 81/467 |

* cited by examiner

*Primary Examiner* — Max Noori
(74) *Attorney, Agent, or Firm* — Belair Intellectual Property Law LLC

(57) ABSTRACT

A torque measuring vise, including a body for operatively supporting one or more movable clamping members defining a clamping axis for releasably securing an object; one or more sensors disposed about the torque measuring vise; and an electronic circuit in communication with the one or more sensors for producing one or more load responsive measurements.

30 Claims, 14 Drawing Sheets

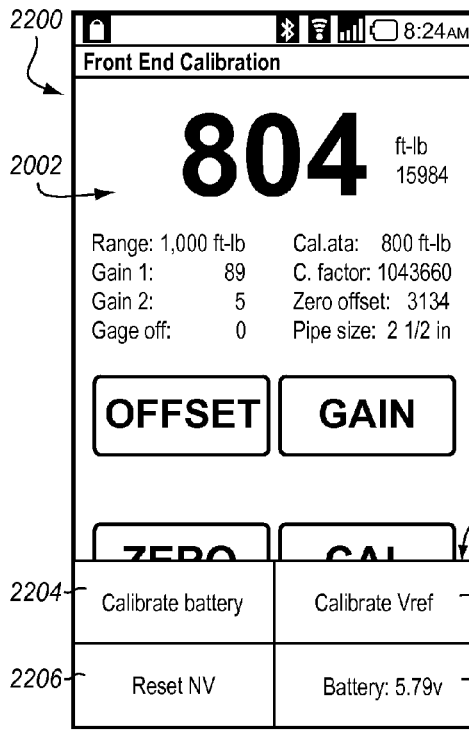 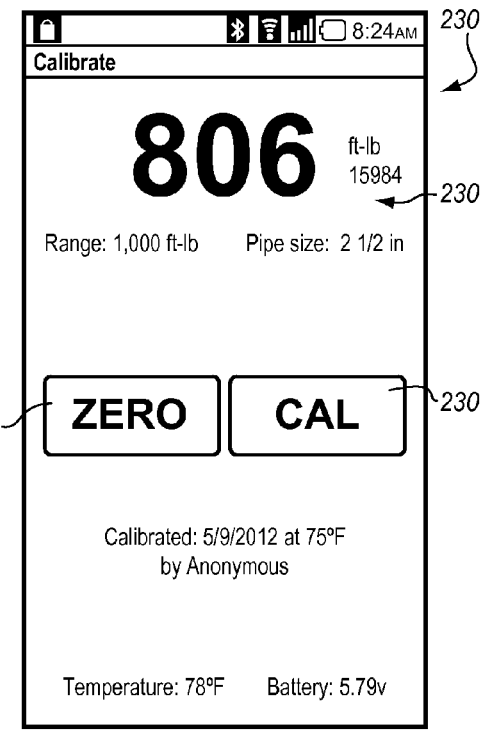
FIG. 22  FIG. 23
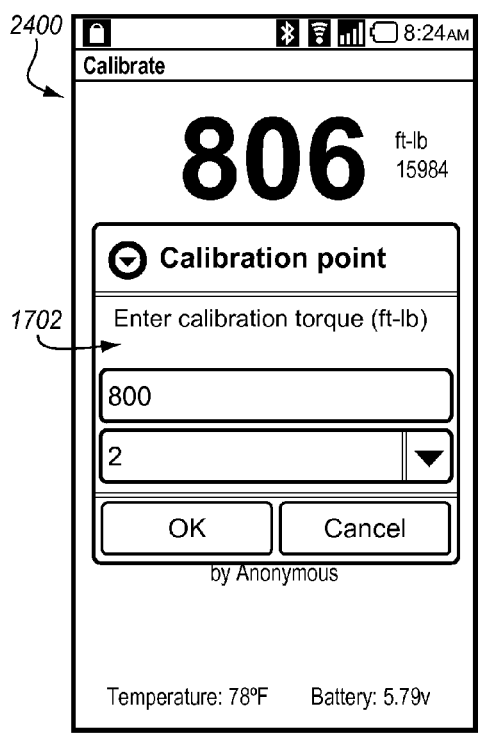 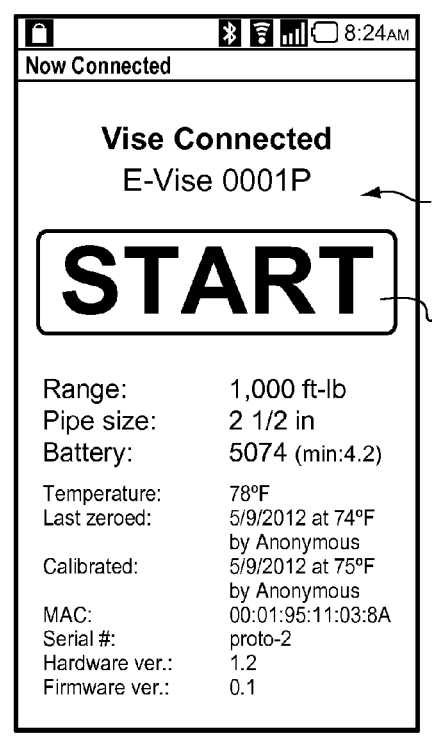
FIG. 24  FIG. 25

TORQUE MEASURING VISE AND NOTIFICATION SYSTEM AND METHOD OF USING SAME

TECHNICAL FIELD OF THE INVENTION

This invention relates, in general, to a vise for measuring torque applied to an object in the vise and, in particular, to a torque measuring vise and notification system and method of using same.

BACKGROUND OF THE INVENTION

Without limiting the scope of the present invention, its background will be described in relation to a torque measuring vise and notification system and method of using same, as an example.

Vises are useful tools for clamping, securing, and holding objects firmly in place to enable an operator to work on the object in a steady and immobile position. Vises typically consist of opposing jaws or surfaces that can be quickly opened and closed enabling the operator to work on the object in many different positions and orientations. Many different operations can be performed on these objects while clamped in a vise, including drilling, sanding, buffing, milling, threading, etc.

One operation that is commonly performed with a vise is applying a rotational force or torque to an object, such as tightening a fitting or threaded connector onto a threaded end of an object, such as a pipe. This operation may include clamping the object into the vise and then applying a torque directly to the threaded connector to secure it to the pipe, such as when joining threaded ends of sections of pipe or tubing. In many instances, the rotational force may be applied by another tool, such as a wrench. Oftentimes, it is desirable that this operation be done to a particular torque specification. In these cases, a torque wrench may be used to provide measurements of the torque applied by the operator to the object.

One problem with current torque wrenches is that they are limited in the types of objects they can be used on. For example, some torque wrenches are designed to be used specifically with nuts and bolts. In another example, torque screwdrivers are designed to be used specifically with screws and screw-like fasteners. So depending on the particular object that is to be torqued in a vise, many different types of torque wrenches may be needed. Additionally, some objects may have a shape or form that is not conducive to be torqued by one of these existing torque wrenches.

SUMMARY OF THE INVENTION

The present invention disclosed herein is directed to a torque measuring vise and notification system and method of using same ("torque measuring vise and notification system"). The present torque measuring vise and notification system measures torque applied to an object held in a vise and wirelessly transmits the torque measurement to a wireless device, computer, etc. The present torque measuring vise and notification system accurately measures torque on any object held in the vise regardless of the wrench handle length, type of wrench, wrench orientation, or if force multipliers (e.g. cheater pipes) are used.

In one embodiment, the present invention is directed to a torque measuring vise and notification system including a torque measuring vise defining a clamping axis for releasably securing an object, the torque measuring vise including one or more sensors disposed about a support member of the torque measuring vise to produce one or more load responsive measurements of the support member during the application of torque to the object; an electronic circuit disposed about the support member to receive the one or more load responsive measurements and to transmit at least one of the group consisting of the one or more load responsive measurements and one or more torque measurements; and a receiving device operable to communicate with the torque measuring vise, the receiving device having a means for receiving at least one of the group consisting of the one or more load responsive measurements and the one or more torque measurements, and to produce a notifier.

In one aspect, the one or more sensors may be disposed about the support member at substantially equal distances from each other. In another aspect, the one or more sensors may be disposed about the support member at substantially non-equal distances from each other. Additionally, the torque measuring vise and notification system may further include a Wheatstone bridge in communication with the one or more sensors. Also, the torque measuring vise and the receiving device may communicate wirelessly. Further, torque measuring vise and the receiving device may communicate via a wired connection.

In yet another aspect, the electronic circuit may store algorithms to determine a repetition rate of the notifier based on the proximity of the one or more torque measurements to a target torque value. Further, the electronic circuit may convert the one or more load responsive measurements to the one or more torque measurements.

In another embodiment, the present invention may be directed to a torque measuring vise for releasably securing an object, including a body for operatively supporting one or more movable clamping members defining a clamping axis; one or more sensors disposed on a support member connected to the body to produce one or more load responsive measurements of the torque measuring vise; and an electronic circuit disposed about the support member to receive the one or more load responsive measurements and to transmit at least one of the group consisting of the one or more load responsive measurements and one or more torque measurements.

In one aspect, the one or more sensors may be disposed about the body at substantially equal distances from each other. In yet another aspect, the one or more sensors may be disposed about the body at substantially non-equal distances from each other. Also, the one or more sensors may include one or more upper sensors disposed about the support member above one or more lower sensors disposed about the support member.

In yet another aspect, the torque measuring vise may further include wired means for transmitting at least one of the group consisting of the one or more of the load responsive measurements and the one or more torque measurements. Also, the torque measuring vise may further include wireless means for transmitting at least one of the group consisting of the one or more of the load responsive measurements and the one or more torque measurements. In still yet another aspect, the one or more sensors may measure at least one of compression and tension of the support member along an axis approximately 90 degrees from the clamping axis of the torque measuring vise during application of torque to the object. Also, the one or more sensors may measure at least one of compression and tension of the support member along an axis between approximately 90 degrees and 0 degrees from the clamping axis of the torque measuring vise during application of torque to the object.

In yet another embodiment, the present invention may be directed to a torque measuring vise and notification system, including a torque measuring vise having a support member for supporting substantially opposing clamping members defining a clamping axis for releasably securing an object, the torque measuring vise including one or more strain gages disposed on the support member to produce one or more load responsive measurements of the support member during the application of torque to the object; an electronic circuit disposed about the torque measuring vise to receive the one or more load responsive measurements, and to transmit at least one of the group consisting of the one or more load responsive measurements and one or more torque measurements; a receiving device operable to communicate with the torque measuring vise, the receiving device having a database to store a target torque value and to receive the at least one of the group consisting of the one or more load responsive measurements and one or more torque measurements, and to produce a notifier based on the proximity of the one or more transmitted torque measurements to the target torque value; and at least one computing device to communicate with the receiving device to receive and store the target torque value and the one or more torque measurements.

In one aspect, the one or more sensors are disposed about the body at substantially equal distances from each other. In another aspect, the one or more sensors are disposed about the body at substantially non-equal distances from each other. Additionally, the torque measuring vise and notification system may further include a Wheatstone bridge in communication with the one or more sensors. Also, the torque measuring vise and the receiving device may communicate wirelessly.

In yet another aspect, the electronic circuit may store algorithms to determine a repetition rate of the notifier based on the proximity of the one or more torque measurements and the target torque value. In still yet another aspect, the electronic circuit may convert the one or more load responsive measurements to the one or more torque measurements.

In yet still another embodiment, the present invention may be directed to a torque measuring vise, including a body for operatively supporting one or more movable clamping members defining a clamping axis for releasably securing an object; one or more sensors disposed about the torque measuring vise; and an electronic circuit in communication with the one or more sensors for producing one or more load responsive measurements.

In one aspect, the one or more sensors are disposed about the body at substantially equal distances from each other. In another aspect, the one or more sensors are disposed about the body at substantially non-equal distances from each other. Also, the electronic circuit may be in communication with a strain gage bridge.

Additionally, the one or more sensors may include one or more upper sensors disposed about the support member above one or more lower sensors disposed about the support member. Also, the torque measuring vise may further include a wireless means for transmitting at least one of the group consisting of the one or more of the load responsive measurements and the one or more torque measurements. In still yet another aspect, the torque measuring vise may further include a wired means for transmitting at least one of the group consisting of the one or more of the load responsive measurements and the one or more torque measurements.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 22 is another exemplary screenshot of a GUI for displaying initial torque measuring vise calibration functionality of the torque measuring vise and notification system according to an embodiment;

FIG. 23 is an exemplary screenshot of a GUI for displaying torque measuring vise calibration functionality of the torque measuring vise and notification system according to an embodiment;

FIG. 24 is another exemplary screenshot of a GUI for displaying torque measuring vise calibration functionality of the torque measuring vise and notification system according to an embodiment;

FIG. 25 is an exemplary screenshot of a GUI for displaying torque measuring vise operation of the torque measuring vise and notification system according to an embodiment;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not limit the scope of the present invention.

The terms "torque," "moment of force," or "moment" may be used generally interchangeably in the following description although in strict engineering definitions these terms may not be technically the same. In the present description, the terms "moment" and/or "torque" may be used interchangeably to define the present torque measuring vise and notification system measuring and notifying a user of the torque applied to an object clamped, secured, held, etc. in a torque measuring vise of the torque measuring vise and notification system, although what is being measured by the torque measuring vise may be moment or moment of force.

Figure 1:
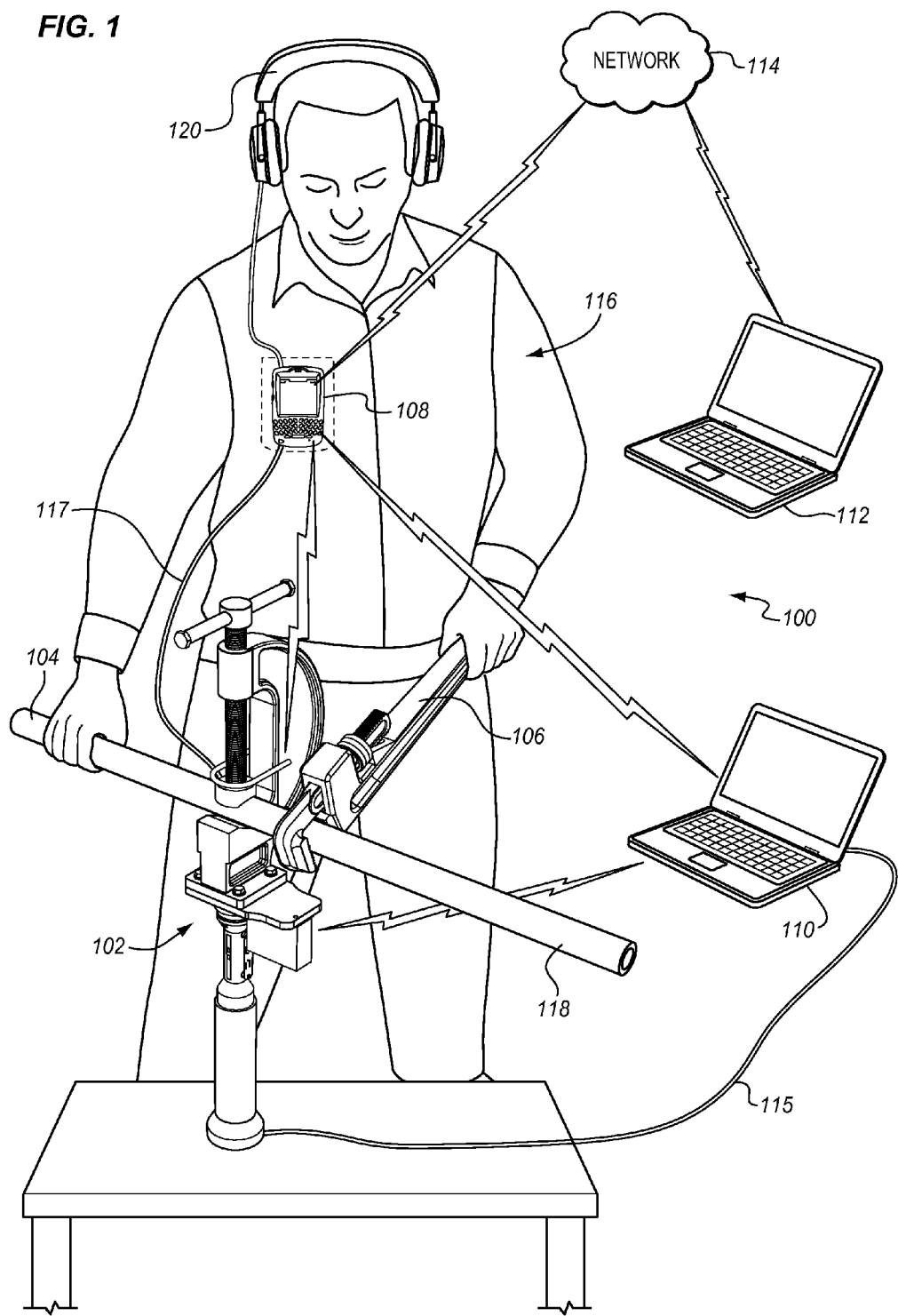
FIG. 1 is a schematic illustration of a torque measuring vise and notification system according to an embodiment.

Referring initially to FIG. 1, a torque measuring vise and notification system is schematically illustrated and generally designated 100. Torque measuring vise and notification system 100 includes a torque measuring vise 102 for holding, securing, clamping, etc. an object, such as a tubular member 104. In general, the clamping axis (CA) of torque measuring vise 102 in this embodiment is aligned with the longitudinal axis with an object secured in torque measuring vise 102, such as tubular member 104. A torque applying device 106 may be engaged with an object, such as tubular member 104, for applying a torque to tubular member 104 while it is securely clamped in torque measuring vise 102, causing a change in moment of torque measuring vise 102. Torque measuring vise and notification system 100 may include a wireless communications device (wireless device) 108 that is capable of communicating wirelessly with torque measuring vise 102. Torque measuring vise and notification system 100 further includes one or more computing devices 110 that are in wireless communication with wireless device 108. Additionally, torque measuring vise and notification system 100 may include one or more computing devices 112 that may be in communication with wireless device 108 via any known networks using any known network 114 as further described below.

Additionally, torque measuring vise and notification system 100 may include one or more computing devices 112 that may be in communication with wireless device 108 via any known networks using any known network 114 as further described below. In one embodiment, torque measuring vise 102 of torque measuring vise and notification system 100 is capable of communicating wirelessly with any of computing devices 110, 112. In another embodiment, torque measuring vise 102 of torque measuring vise and notification system 100 is capable of communicating via a wired connection 115 with any of computing devices 110, 112. In yet another embodiment, torque measuring vise 102 is capable of communicating wirelessly and/or via a wired connection with computing devices 110, 112. Further, torque measuring vise 102 may be capable of communicating with computing devices 110, 112 via network 114. In yet another embodiment, wireless device 108 may be in communication with torque measuring vise 102 via a wired connection 117.

A user 116 may operate torque measuring vise 102 and torque applying device 106 to apply torque to tubular member 104 for tightening a threaded end of tubular member 104 with a threaded object 118, for example. In one example, object 118 may be a tubular member that is joined via a threaded connection to tubular member 104. In general, user 116 securely clamps tubular member 104 in torque measuring vise 102 and then securely grips torque applying device 106 to object 118 for applying torque or moment to object 118. Although, torque applying device 106 is shown in a particular orientation relative to tubular member 104, it is clear that torque applying device 106 may be oriented relative to tubular member 104 in any orientation desired by the user during operation of torque measuring vise and notification system 100.

In another embodiment, torque measuring vise and notification system 100 may be used with any additional force and/or load generating devices for providing additional torque or moment to tubular member 104 and/or object 118, for example. Also, the present invention is being described holding, securing, clamping, etc. a tubular member 104 and/or object 118, but torque measuring vise and notification system 100 may be used when desiring to apply and measure torque applied to any object having any form or shape being held, secured, clamped, etc. by torque measuring vise 102 of torque measuring vise and notification system 100.

Torque measuring vise and notification system 100 may be used in any type of environments, including in the field, in a shop, and/or or inside a building where pipe strings, coiled tubing strings, tool strings and the like are made up. Although torque measuring vise 102 and torque measuring vise and notification system 100 have been described in relation to tubular members, torque measuring vise and notification system 100 may be used with any types of tools that apply torque or force to another object, regardless of shape, form, etc.

Torque measuring vise and notification system 100 measures the torque applied by torque applying device 106 to tubular member 104 and/or object 118 and generates and provides notifiers to user 116 based on actual torque measurements and a target torque value, for example. Such notifiers, as discussed further below, may be any type of notifiers including tactile, visual, auditory, vibratory, and aural that may be presented to user 116 through listening devices 120, in one instance. Wireless device 108 may be carried anywhere on an operator or user's 116 person, and in one example, wireless device 108 may be carried in a user's 116 pocket. Wireless device 108 may also be carried in a holster that attaches to a belt of user 116, for example.

In another embodiment, torque measuring vise and notification system 100 may generate and provide such notifiers to another user who may then notify user 116 that the target torque value has been achieved. Likewise, any number of users may access any of the computing devices 110, 112 to be notified of any of the data and information herein disclosed and may present such information and data to user 116 or others. Further, wireless device 108 may provide any of the data and notifiers to any other users up to any distance transmittable by wireless device 108.

Figure 2:
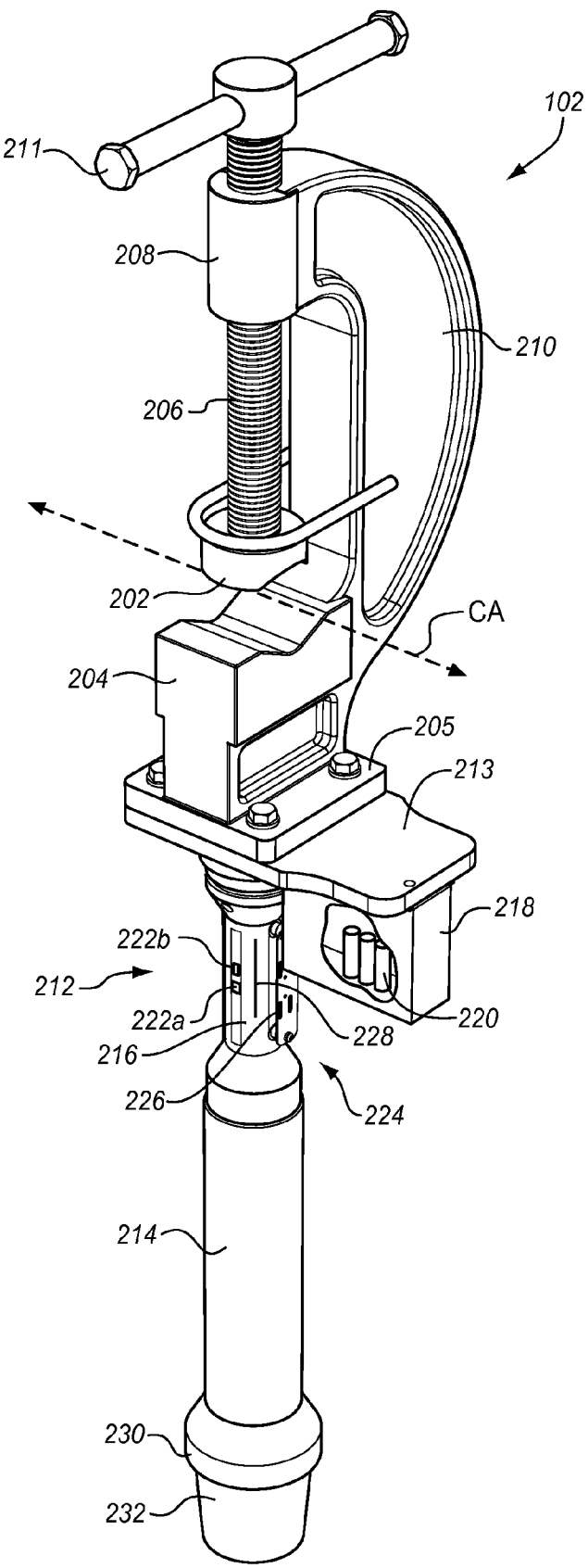
FIG. 2 is a perspective view of a torque measuring vise of the torque measuring vise and notification system according to an embodiment.

Turning now to FIG. 2, an embodiment of torque applying device 102 is shown. Torque measuring vise 102 may include an upper jaw 202 and a lower jaw 204 that operate together to securely grip an object 118, such as tubular members 104, 116. Upper jaw 202 and lower jaw 204 may be teeth, flat surfaces, curved surfaces, curvilinear surfaces and/or dies disposed about the surfaces of each that face each other. Additionally, torque measuring vise 102 may include an upper mounting plate 205 for mating with a lower mounting plate 213 to provide rotational adjustability for body 210 relative to torque measuring unit 212 (below). Body 210 may be positioned in any orientation relative to torque measuring unit 212 and then secured in place by fasteners, such as bolts, etc., securing mounting plate 205 to mounting plate 213 as in commonly known to those skilled in the arts.

Typically, upper jaw 202 may be an adjustable jaw that includes a threaded portion 206 for engaging with an internally threaded portion 208 of torque measuring vise 102 for adjusting the distance between upper jaw 202 and lower jaw 204. Torque measuring vise 102 may further include a body 210 for providing support to upper jaw 202 and lower jaw 204. A handle 211 is rotated by a user, such as user 116, to raise and lower upper jaw 202 for securing tubular members 104, 118 firmly into position between upper jaw 202 and lower jaw 204. User 116 may then use torque applying device 106 to produce a torque on one or both of tubular members 104, 118 that is measured by torque measuring vise 102. Torque measuring vise 102 then notifies user 116 of the actual real-time torque measurements being applied to tubular members 104, 118 and further may notify user 116 of the proximity of the actual torque measurement to a target torque value, as described further below.

Torque measuring vise 102 may further include a torque measuring unit 212 that includes a housing 214 that substantially encloses a portion of a structural or support member, such as post 216. As will be discussed more thoroughly below, torque measuring vise and notification system 100 measures bending strain in post 216 of torque measuring vise 102. Housing 214 may be any shape or form of housing that substantially encloses all or a portion of post 216. In one aspect, housing 214 may be a substantially cylindrical housing. Preferably, housing 214 is made and/or formed of a material that doesn't prevent wireless transmissions, such as electromagnetic waves, radio frequency signals, etc., from transmitting between torque measuring vise 102 and wireless device 108.

Preferably, housing 214 may have additional holes or vias for accepting wires and the like from additional sensors that may be disposed about post 216. Preferably, housing 214 is made of flexible, elastic, and the like material such that it does not interfere or counter the bending or flex of housing 214 during operation of torque measuring vise 102.

Torque measuring vise 102 further includes a power unit 218 that may be disposed about torque measuring vise 102 for powering the electronics contained within or on post 216 and/or torque measuring vise 102. In one embodiment, power unit 218 may include one or more batteries 220 as known to those skilled in the arts. Preferably, batteries 220 have good temperature variation performance, such that they provide substantially stable voltage through a wide range of environmental operating conditions. In one embodiment, batteries 220 may be lithium iron disulfide batteries, which provide very good low temperature performance. In another embodiment, power unit 218 may be powered by electric current from either an alternating current (AC) or direct current (DC) source.

In one embodiment, torque measuring unit 212 may further include one or more strain gages 222a, 222b (collectively strain gages 222) disposed substantially about post 216 of torque measuring unit 212 of torque measuring vise 102 for detecting the strain of post 216 when applying force and/or torque to object 118 secured in torque measuring vise 102, such as tubular members 104, 118. In one embodiment, strain gages 222 are one or more "foil-type" strain gages that are disposed about post 216 in a location that provides optimal sensitivity to the strain, flex, compression, tension, and the like of post 216 of torque measuring vise 102 during operation of torque measuring vise 102.

Preferably, strain gages 222 may have insulating flexible backing having an adhesive for adhering to a surface of post 216. Adhesives may be used for affixing strain gages 222 to surfaces of post 216. As post 216 is deformed during operation, strain gages 222 are slightly deformed causing the electrical resistance of strain gages 222 to change. Any type of strain gage that is mountable to torque measuring vise 102 and that can provide strain readings of post 216 during operation of torque measuring vise 102 may be used. In one embodiment, strain gages 222 are manufactured by Omega Engineering, Inc. and have part number SGD-7/1000-DY11, for example. Technical specifications of this strain gage are incorporated herein by reference.

Figure 7:
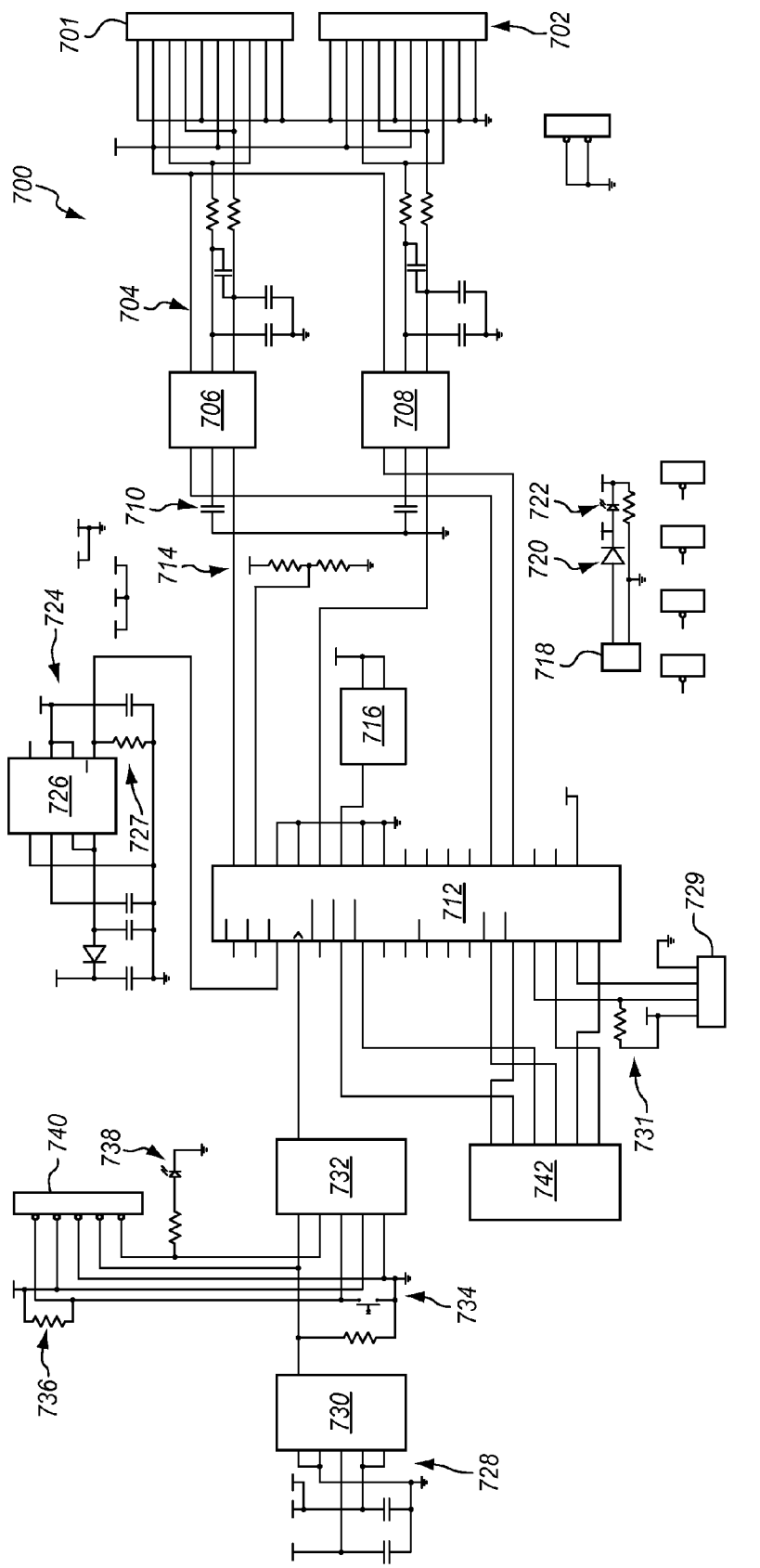
FIG. 7 is an electronic schematic diagram of circuitry of a torque measuring vise of the torque measuring vise and notification system according to an embodiment.

Torque measuring unit 212 further includes an electronic circuitry 224, such as printed circuit board ("PCB") PCB 226 that is described further with reference to FIG. 7. PCB 226 may be affixed, attached, and/or adhered to any part of torque measuring vise 102 by any known means, such as by use of adhesives, fasteners, bolts, screws, and the like. In one embodiment, power unit 224 may be located or disposed on a part of torque measuring vise 102 and electronic circuitry 232 may be located or disposed on post 216.

In one embodiment, torque measuring vise 102 may further include one or more tattle-tale wires 228 for providing notification to user 116 that torque measuring vise 102 may have been over torqued. If torque measuring vise 102 was operated beyond its designed limitations, tattle-tale wires 228 may break indicating that torque measuring vise 102 may need to be replaced. In one embodiment, circuitry 224 of torque measuring vise 102 may sense that tattle-tale wires 228 has been compromised, broken, and/or open and report such status to wireless device 108 and/or computing devices 110, 112. In general, tattle-tale wires 228 may be located where compression and/or tension of post 216 of torque measuring vise 102 occurs. In one aspect, tattle-tale wires 228 may be located or disposed about a surface of post 216 of torque measuring vise 102. In another aspect, tattle-tale wires 228 may be substantially proximal to strain gages 222.

In general, if torque measuring vise 102 is over torqued during normal operations, strain gages 222 may indicate such a condition to electronic circuitry 224 for transmitting to computing devices 110, 112 and user 116. Tattle-tale wires 228 may be useful when torque measuring vise 102 may be in an off state and be over torqued.

In addition to the strain gages 222 used for sensing strain, another strain sensitive element may be installed in a high strain area of post 216. This strain sensitive element may be constructed such that it will be permanently altered if torque measuring vise 102 is ever subjected to excessive torque. As a safety and health check for torque measuring vise 102, the condition of this element may be monitored by circuitry 224 and if an "over-torque" history is sensed this may be indicated on a wireless device 108 application and may be used to make torque measuring vise 102 inoperable.

Additionally, torque measuring vise 102 may include housing or bracket components for enabling torque measuring vise 102 to be quickly removed from a securing surface and moved to another securing surface for use, making torque measuring vise 102 a portable device, in one instance. For example, torque measuring vise 102 may include a slightly larger diameter bracket 230 for providing a stop when inserting the end 232 of torque measuring vise 102 into a securing surface such as a workbench and the like. Other brackets, stops, fasteners, and the like may be used for securing torque measuring vise 102 to a securing surface in any type of environments.

Post 216 may be made of any type of material that is capable of supporting upper jaw 202, lower jaw 204, body 210 during operation of torque measuring vise 102. Post 216 must be capable of bending or flexing slightly while force is applied to object 118 secured in torque measuring vise 102. Post 216 may be any shape, form, etc. for supporting upper jaw 202, lower jaw 204, body 210.

Figure 3:
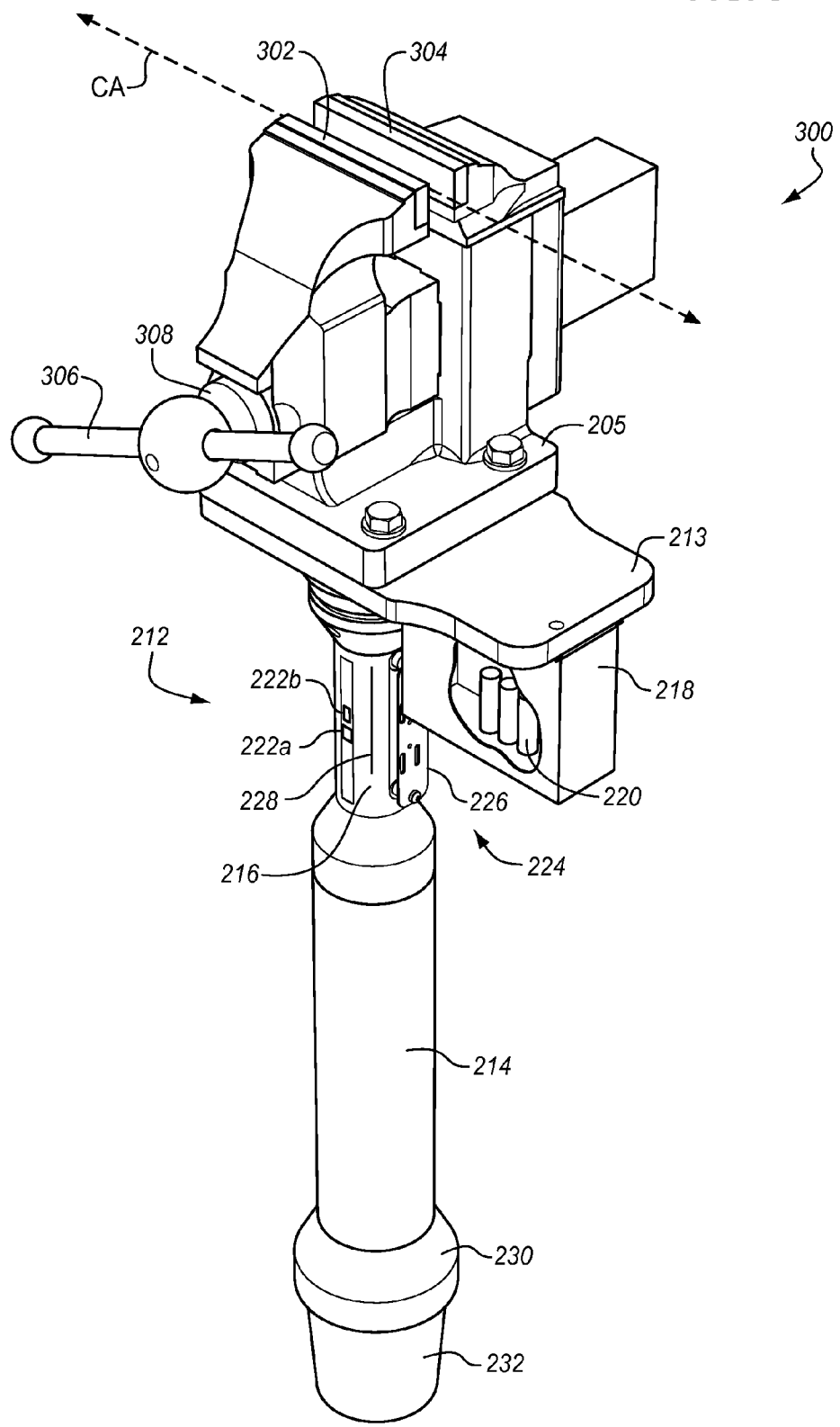
FIG. 3 is a perspective view of a torque measuring vise of the torque measuring vise and notification system according to another embodiment.

Referring now to FIG. 3, another torque measuring vise is schematically illustrated and generally designated 300. Torque measuring vise 300 may include some or all of the elements and features of torque measuring vise 102. Torque measuring vise 300 may include a first jaw 302 and second jaw 304 that oppose each other for securing one or more objects, such as tubular members 104, 118. Torque measuring vise 300 may further include a handle 306 for turning a threaded drive member 308 that engages a threaded portion (not shown) located on the rear portion of torque measuring vise 300. Torque measuring vise 300 may include many of the same elements as described relative to torque measuring vise 102, and the location and functionality of these common elements and features are similar and/or identical to those related elements and features described above with reference to torque measuring vise 102.

In addition to torque measuring vises 102, 300 described herein, torque measuring unit 212 of torque measuring vise and notification system may further include other types of vise devices, including bench vises, woodworking vises, engineer's vises, machine vises, metalworking vises, etc.

In addition to measuring torque and notifying user 116 of proximity of actual torque measurements to target torque value, any and all of the data acquired by wireless device 108 from torque measuring vises 102, 300 may be used to determine operations of torque measuring vises 102, 300 which measurement came from where and for what purpose, track down issues with torque measuring vises 102, 300, limitations of torque measuring vises 102, 300, confirm that torque measuring vises 102, 300 are operating as expected, design flaws, etc.

Figure 4A:
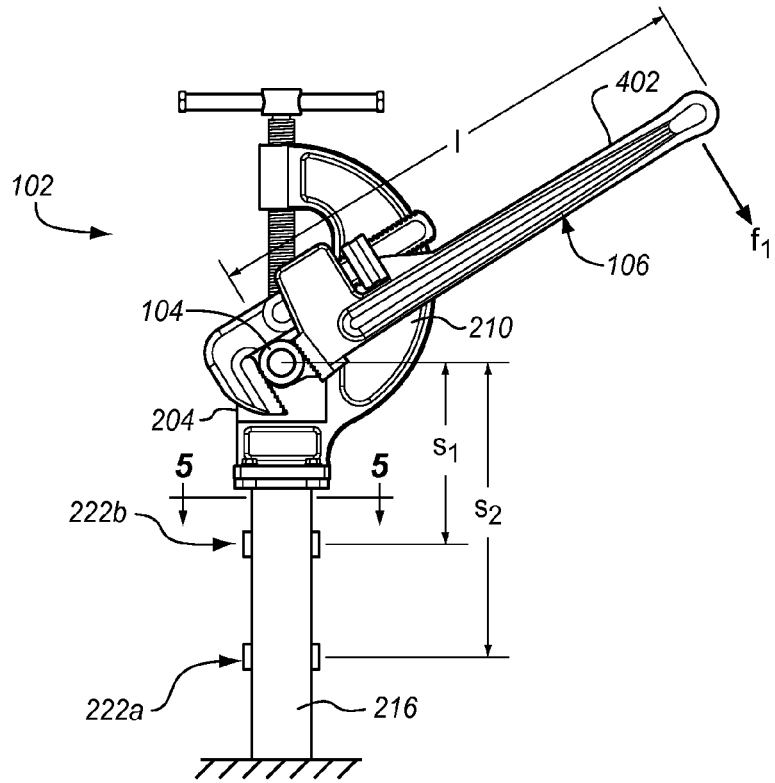
FIG. 4A is a side view of a torque measuring vise of FIG. 2 showing forces and moments on a clamped object under rotational force by a torque applying device of the torque measuring vise and notification system according to an embodiment.
Figure 4B:
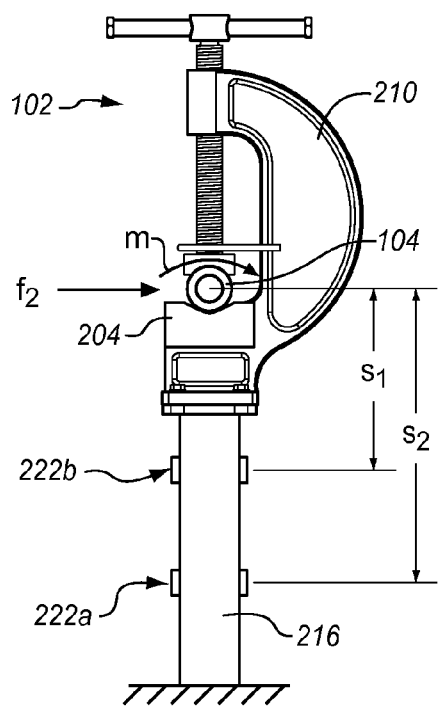
FIG. 4B is a side view of a torque measuring vise of FIG. 2 showing forces and moments on a clamped object under rotational force by an equivalent force and moment applied as that shown in FIG. 4A of the torque measuring vise and notification system according to an embodiment.

Turning now to FIGS. 4A-4B, torque measuring vises 102, 300 are shown having tubular member 104 securely clamped between upper jaw 202 and lower jaw 204 with torque applying device 106 further shown applying rotational force to tubular member 104. Torque measuring vises 102, 300 are shown having a set of strain gages 222b disposed about post 216 and above a second set of strain gages 222a also disposed about post 216. In this embodiment, strain gages 222b are located above strain gages 222a on post 216 of torque measuring vises 102, 300. As discussed herein, any number and location of strain gages 222 may be employed for measuring bending of post 216 during torquing of objects, such as tubular members 104, 118. For example, any number of strain gages 222 may be located above or below any other number of strain gages 222 for measuring the bending or flexing of torque measuring vise 102.

In one embodiment, strain gages 222b includes a first strain gage 222b located 90 degrees from the clamping axis CA of torque measuring vises 102, 300 and further includes a second strain gage 222b located 180 degrees from the first strain gage 222b. Additionally, strain gages 222a includes a first strain gage 222a located 90 degrees from the clamping axis CA of torque measuring vises 102, 300 and further includes a second strain gage 222a located 180 degrees from the first strain gage 222a. Strain gages 222b are located a distance ($S_1$) from the center of tubular member 104 and strain gages 222a are located a distance ($S_2$) from the center of tubular member 104. In this embodiment, $S_2$ is greater than $S_1$. The handle 402 of torque applying device 106 has a length (L) from the far end to the center of tubular member 104. Additionally, a force ($F_1$) is shown applied at substantially the far end of handle 402 at the distance L. FIG. 4B shows an equivalent force ($F_2$) and moment (M) as that produced by $F_1$ and L in FIG. 4A.

With reference to FIG. 4B, post 216 acts as a cantilever beam for the moment and force applied, so strains ($\epsilon$) measured at strain gages 222b will be a function (f) of both the moment and force as follows:

$$\epsilon_1 := f(M, F_2). \qquad \text{Equation \#1}$$

Further, the strains measured at strain gages 222a will a function of both the moment and force as follows:

$$\epsilon_2 := f(M, F_2). \qquad \text{Equation \#2}$$

Preferably, post 216 behaves like a beam and the strain in post 216 is caused by an applied moment and may vary linearly with the moment applied. Strain at a point on post 216 caused by an applied force will vary linearly with the applied force. Therefore, Equations #1 and #2 can be rewritten with proportionality constants: $K_1$, $K_2$, $K_3$, $K_4$; as follows:

$$\epsilon_1 := K_1*M + K_2*F \quad \text{Equation \#3}$$

$$\epsilon_2 := K_3*M + K_4*F \quad \text{Equation \#4}$$

Equations #3 and #4 may be combined to eliminate F and provide an equation for the moment using only the proportionality constants and the measured strains at strain gages 222a and strain gages 222b, respectively, as follows:

$$M := (K_4*\epsilon_1 - K_2*\epsilon_2)/(K_1*K_4 - K_3*K_2). \quad \text{Equation \#5}$$

The moment calculated by Equation #5 is the torque applied by torque applying device 106 regardless of the handle length, direction, or magnitude of force applied. In one embodiment, $K_1$ and $K_3$ are determined by placing a known moment to torque measuring vises 102, 300 during calibration and using Equations #1 and #3 with F set to zero to solve for proportionality constants, $K_1$ and $K_3$. Proportionality constants, $K_2$ and $K_4$ are determined by placing a known force on torque measuring vises 102, 300 during calibration and using Equations #1 and #3 with M set to zero to solve for proportionality constants, $K_2$ and $K_4$. If the geometry of post 216 at strain gages 222a and strain gages 222b are identical, then proportionality constant $K_3$ will be equal to proportionality constant $K_1$, and the following equations may be derived:

$$\epsilon_1 := K_1*M + K_2*F \quad \text{Equation \#6}$$

$$\epsilon_2 := K_1*M + K_4*F \quad \text{Equation \#7}$$

Equations #6 and #7 may be combined to eliminate F and derive an equation for the moment using only the proportionality constants and the locations of strain gages 222a and strain gages 222b, as follows:

$$M := (K_4*\epsilon_1 - K_2*\epsilon_2)/(K_1*K_4 - K_1*K_2). \quad \text{Equation \#8}$$

The moment calculated by Equation #8 is the torque applied by torque applying device 106 regardless of the handle length, direction, or magnitude of force applied. Proportionality constant $K_1$ may be measured by placing a known moment to torque measuring vises 102, 300 during calibration. Proportionality constants $K_2$ and $K_4$ may be measured by placing a known force to torque measuring vises 102, 300 during calibration.

Figure 5A:
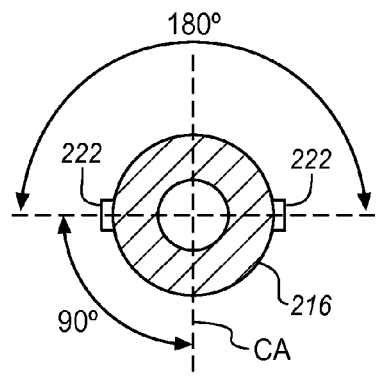
FIG. 5A is a top view of a post of a torque measuring vise having two strain gages disposed about the post according to an embodiment.

Referring now to FIG. 5A, an embodiment of a cross-section of post 216 of torque measuring vises 102, 300 is illustrated having two strain gages 222 located on post 216 at approximately 180 degrees from each other. Strain gages 222 are shown located about post 216 at an angle approximately 90 degrees from the clamping axis CA for securing objects, such as tubular members 104, 118. Strain gages 222 are able to measure the bending and strain of post 216 when torque applying device 106 is applying torque or moment to an object, such as tubular members 104, 118. Preferably in this embodiment it is desirable to apply torque inducing force or moment inducing force by torque applying device 106 parallel to an imaginary line that connects the clamping axis (CA) to the location on the support structure where strain gages 222 are located. In doing so, strain gages 222 may measure the actual strain applied to an object, such as tubular members 104, 118, without needing to correct for force that may be applied in a direction slightly not aligned with this axis.

Figure 5B:
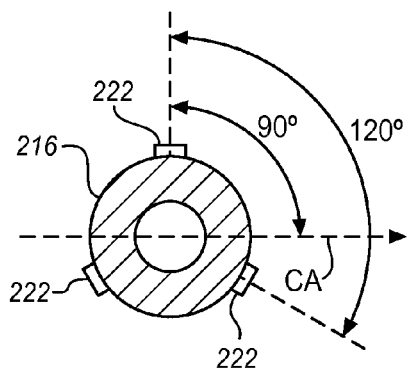
FIG. 5B is a top view of a post of a torque measuring vise having three strain gages disposed about the post according to another embodiment.

With reference now to FIG. 5B, an embodiment of a cross-section of post 216 of torque measuring vises 102, 300 is illustrated having three strain gages 222 located on post 216 at approximately 120 degrees from each other. In this embodiment, one of strain gages 222 is shown located about post 216 at an angle approximately 90 degrees from the clamping axis CA for securing objects, such as tubular members 104, 118. Additionally, the other two remaining strain gages 222 are located on post 216 at approximately 30 degrees from the clamping axis for measuring any force, torque, and/or moment that is applied to an object, such as tubular members 104, 118, not substantially 90 degrees to the clamping axis. Corrections for the amount of torque and moment applied to an object may be made by subtracting out the force measured by the two other strain gages 222.

Figure 6:
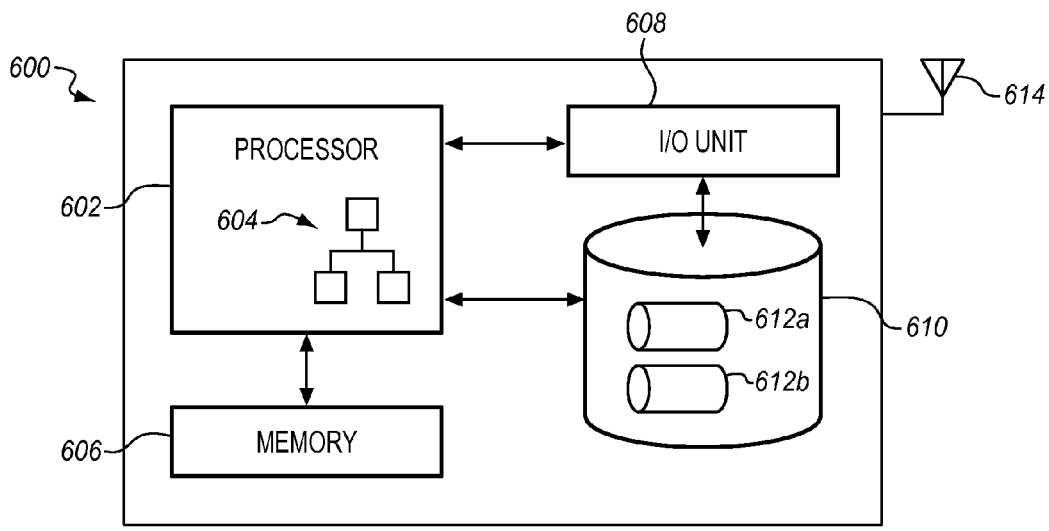
FIG. 6 is a block diagram of components of a computing device of the torque measuring vise and notification system according to an embodiment.

With reference now to FIG. 6, a block diagram of exemplary computing devices 110, 112 and wireless device 108 is schematically illustrated and generally designated 600. Computing devices 110, 112 and wireless device 108 may include a processor 602 that executes software 604. Processor 602 may be in communication with memory 606, an input/output ("I/O") unit 608, and a storage unit 610. Storage unit 610 may store databases or data repositories 612a, 612b thereon. Computing devices 110, 112 may further include an antenna 614 for receiving and transmitting data between torque measuring vises 102, 300 and computing devices 110, 112. Software 604 may include instructions for execution by processor 602 for providing network connectivity and computer status information in accordance with the principles of torque measuring vise and notification system 100. Additionally, torque measuring vise and notification system 100 may include any type of servers and the like that may be used with computing devices 110, 112 and wireless device 108. Preferably, torque measuring vise and notification system 100 may further include wireless communication capabilities as are commonly known in the arts for communicating with wireless device 108 and/or torque measuring vise 102 directly. Some exemplary technologies, include Bluetooth, and/or other wireless communication standards herein discussed. In some environments the wireless standards used to communicate between wireless device 108 and torque measuring vises 102, 300 may be operated at normal wireless signal power outputs such that torque measuring vises 102, 300 and wireless device 108 may communicate at normal ranges of the wireless standards herein described.

In some other environments, it may be important that the effective distance of the wireless signals between torque measuring vises 102, 300 and wireless device 108 be limited. For example, drilling operations performed in the field may include perforating devices for perforating casing, tubing, liners, and the like, and oftentimes these perforating devices are operated by wireless standards or technologies. To avoid interfering with these devices, the power of transmitter/transceivers of wireless device 108 and torque measuring vises 102, 300 may produce a lower than normal power output to as to limit the distance of the wireless signals between torque measuring vises 102, 300 and wireless device 108.

In one embodiment, the wireless standard used for transmitting the data and information herein described between torque measuring vises 102, 300 and wireless device 108 may be Bluetooth® standard, or other wireless standard, wherein the power output of the devices may be less than a standard output to limit the range of the wireless signals. In one aspect, the range may be less than 10 feet. In another aspect, the range may be less than 6 feet. In one embodiment, the transmission power of torque measuring vises 102, 300 and wireless device 108 may be less than 1 mW. In one aspect, the transmission power from about 0.1 mW to about 1.0 mW.

In another embodiment, the wireless standard used for communicating between torque measuring vises 102, 300 and wireless device 108 in such short range applications may be Near Field Communication ("NFC").

Additionally, wireless device 108 may be operated where no existing wireless communication networks and/or links are available between it and computing devices 110, 112. In such a case, wireless device 108 may store torque measurements and related data and aggregate the data for later transmission once wireless communication network and/or link is established at a later time. Plus, by storing all this information on wireless device 108, user 116 may be able to access this data on location and/or during operation.

Computing devices 110, 112 and wireless device 108 may include any known types of devices that are capable of communicating over antennas as is commonly known in the arts. Wireless device 108 may include mobile phones, cellular phones, Blackberry® wireless devices, iPhone® wireless devices, Android® wireless devices, personal digital assistances ("PDA"), laptops, electronic tablets, personal computers, evolution data optimized ("EVDO") cards, multi-mode devices, and/or other wireless devices and elements.

Torque measuring vise and notification system 100 may include various elements used for wireless and/or wired communication. Network 114 may include mobile switching centers ("MSCs"), local exchanges, networks, antennas or transmission towers, wireless devices, computers, personal computers, servers, computing devices, and wired communication devices for facilitating the transmission of data between computing devices 110, 112 and wireless device 108, in one embodiment.

In one embodiment, computing devices 110, 112 and wireless device 108 may communicate using wireless communications including satellite connections or hardwired connections, such as fiber optics, T1, cable, DSL, high speed trunks, and telephone lines. In one aspect, any number and location of computing devices 110, 112 and wireless device 108 may exist. Further, computing devices 110, 112 and wireless device 108 may communicate with transmission towers using any communications standards, such as time division multiple access ("TDMA"), code division multiple access ("CDMA"), global systems for mobile ("GSM") communications, personal communications systems ("PCS"), wireless local area network ("WLAN"), worldwide interoperability for microwave access ("WiMAX"), or other frequently used cellular and data communications standards and standards.

Network 114 may be any number or combination of networks including wireless networks, data or packet networks, private networks, publicly switched telephone networks ("PSTN"), and/or wired networks. Network 114 of torque measuring vise and notification system 100 may represent a single communication service provider or multiple communications services providers. Network 114 may include any number of systems, towers, servers, and other network and communications devices for implementing the features and performing the methods herein described.

Network 114 may be the Internet, intranet, wide area networks ("WANs"), local area networks ("LANs"), or other communication systems capable of communicating information between computing devices 110, 112 and wireless device 108. Computing devices 110, 112 and wireless device 108 may communicate data packets containing information related to any of the operations of torque measuring vises 102, 300 to other computing devices 110, 112 as understood in the art.

Even though FIG. 1 depicts several computing devices 110, 112 and a wireless device 108, it should be understood by those skilled in the art that torque measuring vise and notification system 100 may include any number and type of computing devices 110, 112 and wireless device 108 without departing from the principles of the present invention.

Referring now to FIG. 7, an electronic schematic diagram of circuitry of an exemplary PCB of torque measuring vises 102, 300 is schematically illustrated and generally designated 700. PCB 700 is in communication with strain gages 222 and they may be hard-wired to a strain gage input 701 of PCB 700. In one embodiment, strain gage input 701 is the strain gage input that connects strain gages 222 in a full bridge bending strain configuration. Preferably, two parts are used to form a full bridge. Additionally, PCB 700 may include another set of strain gage inputs 702 that may be used with additional strain gages.

PCB 700 may include a radio frequency ("RF") filter 704 that provides RF filtering prior to sensor signal amplifiers 706, 708. In one embodiment, PCB 700 may further include a capacitor 710 for providing noise filtering. The amplified voltage of sensor signal amplifier 706 is measured by a microcontroller module 712 to obtain a strain reading of torque measuring vises 102, 300. In one embodiment, microcontroller module 712 is manufactured by Netburner having part number MOD5213, which is a microcontroller module based on the Freescale MCF5213 ColdFire integrated microcontroller. Microcontroller module 712 may be primary microcontroller of torque measuring vises 102, 300 and is responsible for all onboard computation not provided in another subsystem of torque measuring vise and notification system 100.

Sensor signal amplifiers 706, 708 are digitally programmable and are under the control of microcontroller module 712 to compensate for physical properties of torque measuring vises 102, 300 including strain/torque relationship, and manufacturing variation. In one embodiment, sensor signal amplifiers 706, 708 are manufactured by Analog Devices having a part number AD8555. PCB 700 may further include voltage dividers 714 that sample the voltage from batteries 220 for measurement by microcontroller module 712. PCB 700 further includes an analog temperature sensor 716 that produces a temperature proportional voltage for measurement by microcontroller module 712. In one embodiment, analog temperature sensor 716 is manufactured by Texas Instruments having part number LM94021.

PCB 700 may also include a battery input connection 718 for connecting with the power output of power unit 218 and/or batteries 220. PCB 700 may further include a diode 720 that provides reverse voltage protection in case batteries 220 are inserted backward into power unit 218. Preferably, a light emitting diode ("LED") 722 is disposed on PCB 700 for reducing the voltage from batteries 220 to a value that is safe to power a voltage regulator 726. Preferably, voltage regulator 726 and capacitors 724 provide a 3.3 volt power supply for the analog subsystem. The power supply is switched on and off under control of microcontroller module 712. A resistor 727 ensures that voltage regulator 726 will shut down when microcontroller module 712 is powered off. A connector 729 and resistor 731 provide access to the diagnostic serial port of microcontroller module 712.

PCB 700 may further include a power supply 730 and capacitors 728 that provide substantially 3.3 volts of regulated power for the digital (primary) subsystem consisting of microcontroller module 712 and a wireless module 742, as discussed further below. In one embodiment, power supply 730 is manufactured by Linear Technology having part number LT1965. Power supply 730 is switched on and off under control of a microcontroller 732, which controls the power on/off state of the primary system (i.e. microcontroller module 712). It receives unregulated battery power through diode 720 and LED 722 such that it is operating at all times when battery power is present. When torque measuring vises 102, 300 is in the power off state, microcontroller 732 monitors the state of a power switch 734. When microcontroller 732 senses any change in the state of power switch 734, either opening or closing, it will enable power supply 730, which will power up microcontroller module 712. Microcontroller 732 will hold the power on for several seconds without responding to any input. This permits microcontroller module 712 to complete its boot sequence and begin normal operation, in one embodiment.

After the initial on-time has elapsed, microcontroller 732 monitors a signal received from microcontroller module 712. When the signal goes low (a power off command from microcontroller module 712 to microcontroller 732), microcontroller 732 will signal power supply 730 to power down, removing power to microcontroller module 712 and placing torque measuring vises 102, 300 into the power off state.

Preferably, power switch 734 and resistor 736 form the power on switch network. In one embodiment, power switch 734 is a magnetic reed switch manufactured by Cherry having part number MP201701. When power switch 734 is in the open state, resistor 736 provides a logic high signal to microcontroller 732, signaling to microcontroller 732 that power switch 734 is open. When power switch 734 is closed, the signal provided to microcontroller 732 by resistor 736 is pulled to a logic low value by grounding the signal through power switch 734. Microcontroller 732 can then sense the closed state of power switch 734. Resistor 736 has a large value such that battery drain is minimized should power switch 734 remain in the closed state for an extended period. Torque measuring vises 102, 300 is powered on by any change in the state of power switch 734, in one embodiment.

Analog power from voltage regulator 726 is controlled at the discretion of firmware embedded in microcontroller module 712. This permits the analog subsystem to be shutdown independent of the primary digital systems to conserve power. PCB 700 may further include a LED 738 for providing power on indication under the control of microcontroller 732. Additionally, PCB 700 may include a integrated circuit serial programming connector 740 that provides in-circuit programmability for microcontroller 732. This permits the firmware for microcontroller 732 to be downloaded into microcontroller 732. PCB 700 may further include wireless module 742. In one embodiment, 742 is a Bluetooth wireless module manufactured by Parani having part number ESD200. Wireless module 742 implements the Bluetooth Serial Port Profile ("SPP") such that microcontroller module 712 can communicate with wireless module 742 using a standard universal asynchronous receiver/transmitter ("UART") serial interface. Firmware embedded in microcontroller module 712 controls and configures the operation of wireless module 742, but the implementation of the Bluetooth standard is contained entirely within wireless module 742, in one embodiment.

In one embodiment, strain gage input 702 may be used by the PCB layout software to reserve two through hole positions on the PCB 700 where strain gage shield wires anchor and connect to ground.

Figure 8:
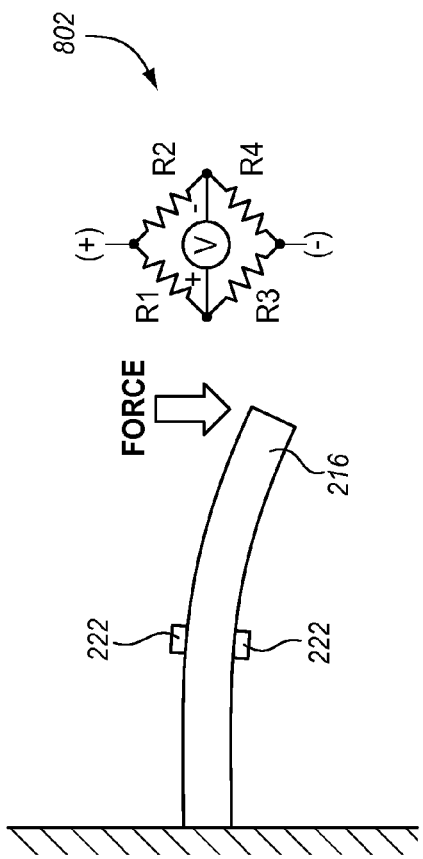
FIG. 8 is an electronic schematic diagram of a Wheatstone bridge in electrical communication with an exemplary set of strain gages of a torque measuring vise of the torque measuring vise and notification system according to an embodiment.

Turning now to FIG. 8, torque measuring vise and notification system 100 may include a Wheatstone bridge 802 for measuring or sensing the flexing or bending of post 216 of torque measuring vise 102. Wheatstone bridge 802 may also be known as a strain gage bridge circuit that measures the strain of post 216 by the degree of resistance imbalance in the bridge circuit. In one embodiment, Wheatstone bridge 802 may be in communication with PCB 700 for determining the amount of strain measured or sensed by strain gages 222. In another embodiment, Wheatstone bridge 802 may be in communication with fewer electronics or circuitry than that described with PCB 700. As discussed relative to FIGS. 5A-5B, any number of strain gages 222 may be disposed about post 216. Further, in yet another embodiment, PCB 700 may not include Wheatstone bridge 802, but use other resistance measuring elements as described herein to measure the amount of strain experienced by strain gages 222.

Wheatstone bridge 802 generally includes four resistor points, $R_1$, $R_2$, $R_3$, and $R_4$, which are wired or bonded together with a voltmeter (V) in the center of Wheatstone bridge 802, in one example. In one embodiment, Wheatstone bridge 802 may be a quarter-bridge by making $R_4$ a strain gage 222 to determine the flexing or bending of post 216. In another embodiment, Wheatstone bridge 802 may be a half-bridge by making the resistors $R_2$ and $R_4$ a separate strain gage 222 each. Additionally, Wheatstone bridge 802 may be a full-bridge by making each of the resistors $R_1$, $R_2$, $R_3$, and $R_4$ a strain gage strain gages 222 each.

In the embodiment where one strain gage 222 is disposed about post 216 of torque measuring vise 102, it is preferable that it be located and positioned approximately degrees to the clamping axis CA for detecting the flexing or bending of post 216 as force is applied to an object secured within torque measuring vise 102. In this embodiment, $R_2$ may be a rheostat that is adjusted to balance Wheatstone bridge 802 when no force is applied to post 216. $R_2$ may be adjusted or set to a value equal to the resistance in of strain gage 222 with no force applied to post 216. $R_1$ and $R_3$ may then be set to each other to provide a balanced Wheatstone bridge 802. The reading at voltmeter V will be zero volts in such a balanced Wheatstone bridge 802. As a force is applied to post 216 causing it to bend or flex slightly, strain gage 222 will be compressed or tensed, depending on its location and position to the clamping axis CA, and its resistance will change accordingly. This change in resistance causes Wheatstone bridge 802 to become unbalanced, which produces a voltage reading at voltmeter V.

In the embodiment where one strain gage 222 is in place of $R_2$ and $R_4$, creating a half-bridge, it is preferable that each of strain gage 222 be located and positioned approximately 90 degrees to the clamping axis CA and 180 degrees apart from each other on post 216 for detecting the flexing or bending of post 216 as force is applied to an object secured within torque measuring vise 102. In this embodiment, as force is applied to an object secured within torque measuring vise 102, post 216 will flex or bend in one direction causing one strain gage 222 to be slightly compressed and the other strain gage 222 to be slightly tensed.

When no force is applied to 216, both strain gages 222 have substantially equal resistance and Wheatstone bridge 802 is balanced. The reading at voltmeter V will be zero volts in such a balanced Wheatstone bridge 802. As a force is applied to post 216 causing it to bend or flex slightly, strain gages 222 will be compressed and tensed, depending on its location and position to the clamping axis CA, and their resistance will change accordingly. This change in resistance causes Wheatstone bridge 802 to become unbalanced, which produces a voltage reading at voltmeter V.

In an embodiment where one strain gage 222 is in place of $R_1$, $R_2$, $R_3$, and $R_4$, creating a full-bridge, it is preferable that two sets of strain gages 222, such as $R_1$ and $R_2$ be complimentarily paired adjacent to one another and positioned or located approximately 90 degrees from the clamping axis CA, while two sets of strain gages 222, $R_3$ and $R_4$, be complimentarily paired adjacent to one another and positioned or located approximately 180 degrees from strain gages 222 $R_1$ and $R_2$. In this embodiment, as force is applied to an object secured within torque measuring vise 102, post 216 will flex or bend in one direction causing a paired set of strain gage 222 to be slightly compressed and the other paired set of strain gage 222 to be slightly tensed.

When no force is applied to 216, both strain gages 222 have substantially equal resistance and Wheatstone bridge 802 is balanced. The reading at voltmeter V will be zero volts in such a balanced Wheatstone bridge 802. As a force is applied to post 216 causing it to bend or flex slightly, strain gages 222 will be compressed and tensed, depending on its location and position to the clamping axis CA, and their resistance will change accordingly. This change in resistance causes Wheatstone bridge 802 to become unbalanced, which produces a voltage reading at voltmeter V.

In yet another embodiment, any number of strain gages 222 may be located and positioned about post 216 of torque measuring vise 102, such as shown in FIGS. 5A-5B. Additionally, strain gages 222 may be placed above and below other strain gages 222 for providing additional strain measuring sensitivity, such as shown in FIG. 2.

Figure 9:
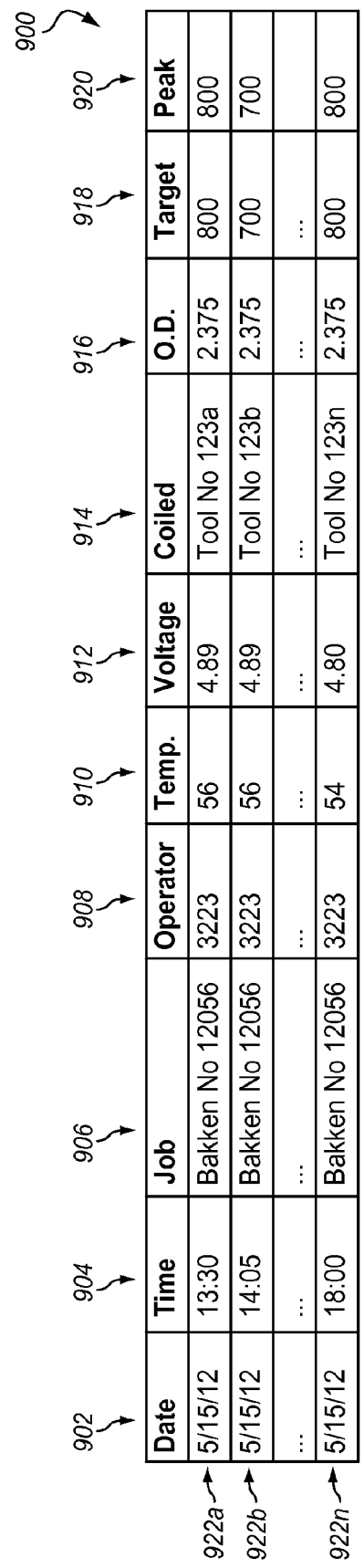
FIG. 9 is a database spreadsheet with columns/rows showing exemplary values of measured torque by a torque measuring vise of the torque measuring vise and notification system according to an embodiment.

Turning now to FIG. 9, an exemplary database of computing devices 110, 112 and wireless device 108 is schematically illustrated and generally designated 900. Database 900 may include a plurality of fields for inputting and storing data transmitted from torque measuring vises 102, 300. For example, database 900 may include a plurality of rows 922a-922n for inputting data from torque measuring vises 102, 300 during a particular operation. Each of rows 922a-922n may input and store data for a different operation of torque measuring vises 102, 300. In addition, database 900 may include a plurality of fields for inputting and storing data for each of these operations, such as a date field 902, time field 904, job field 906, operator field 908, temperature field 910, voltage field 912, coiled tubing tool field 914, outer diameter field 916, target torque value field 918, and peak torque measurement field 920, for example.

In one embodiment, one of rows 922a-922n may correspond to a particular use or operation of torque measuring vises 102, 300. For example, row 922a shows a particular date and time in date field 902 and time field 904 relating to a particular use of torque measuring vises 102, 300. Additionally, it may show a particular job site or location information in job field 906. Further, it may show a particular operator, by name or some other identifier, in operator field 908 that operated torque measuring vises 102, 300 at that date, time, and location. Similarly, data and information relating to environmental temperature may be inputted and stored in temperature field 910. Also, the voltage provided by power unit 218 and/or batteries 220 may be inputted and stored in voltage field 912. The particular information relating to which tubular member and/or tool that was being torqued during that time and date of the operation may be inputted and stored in coiled tubing tool field 914. Outer diameter field 916 may be used to input and store information relating to the outer diameter of the tubular member that torque measuring vises 102, 300 was engaged with for purposes of calibration and the like may be inputted and stored in outer diameter field 916. The set target torque value for that particular joint between the tubular members may be inputted and stored in target torque value field 918. Further, the peak torque measurement provided by torque measuring vises 102, 300 during that particular operation may be inputted and stored in peak torque measurement field 920. In addition to the fields shown, database 900 may include any number of other fields and data that relate to a particular operation of torque measuring vises 102, 300.

Figure 10:
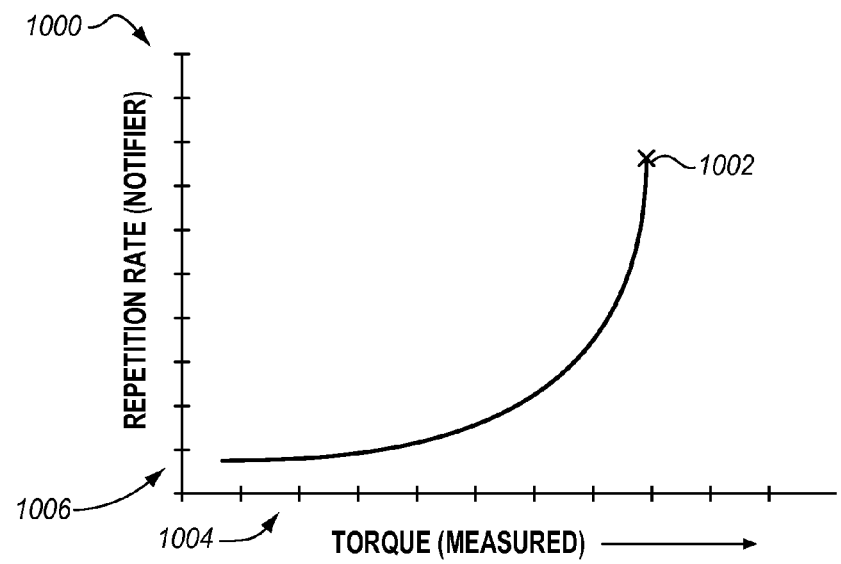
FIG. 10 is a graphical illustration of varying repetition rates of notifiers as a function of proximity of actual torque measurement to target torque value of the torque measuring vise and notification system according to an embodiment.

Referring now to FIG. 10, a graphical illustration of the repetition rate of tones generated by wireless device 108 is schematically illustrated and generally designated 1000. A data curve is shown that may generally represent in one embodiment of wireless device 108 generating repetition rates for notifiers. A target torque value 1002 is determined and as the current torque measurement 1004 approaches target torque value 1002, the frequency of the repetition rates for the notifiers 1006 is increased notifying user 116 that the target torque value 1002 is being approached and/or reached.

Target torque value 1002 may be any torque value and may be entered by user 116, and or programmed into computing devices 110, 112, and/or wireless device 108. The algorithm for producing the data curve may be any desired algorithm such that it produces a different repetition rate of the notifier to quickly and conveniently notify user 116 that the torque applied to torque measuring vises 102, 300 is approaching or has reached target torque value 1002 without user 116 having to guess how close the applied torque is to target torque value 1002. The shape of the data curve is exemplary, and it may be any shape desired by a user 116 and/or operator of torque measuring vise and notification system 100.

Figure 11:
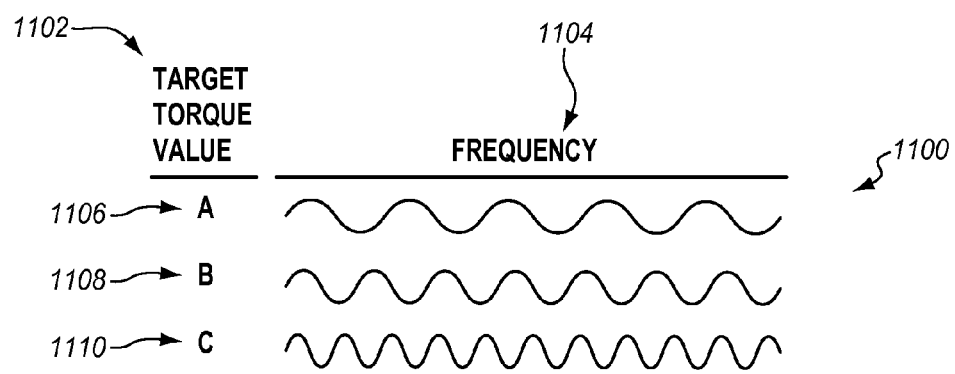
FIG. 11 is an illustration of varying wavelength frequencies of notifiers according to an embodiment.
Figure 12:
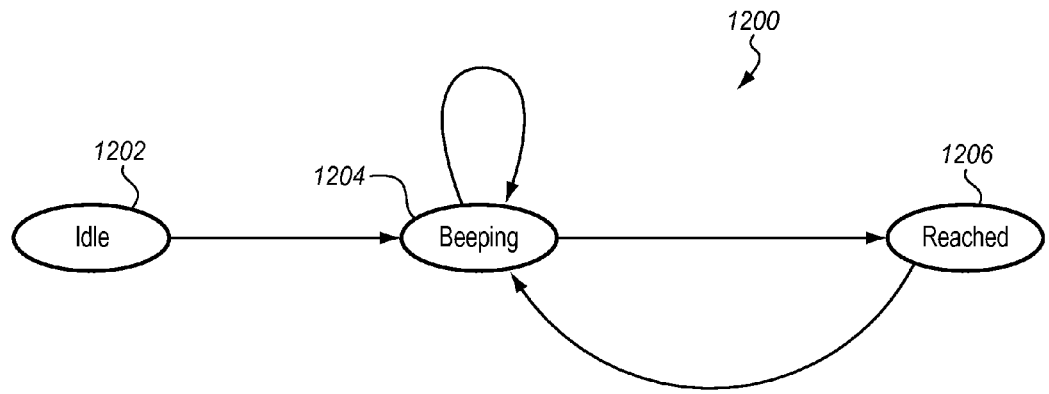
FIG. 12 is an illustration of a process for generating varying repetition rates for notifiers of the torque measuring vise and notification system according to an embodiment.

Now turning to FIG. 11, an exemplary illustration of different wavelength frequencies of notifiers corresponding to different target torque values is schematically illustrated and generally designated 1100. Torque measuring vise and notification system 100 may provide for using different notifiers (tactile, aural, audible, visual, etc.) that may correspond to different target torque values for providing quick and convenient notifiers to user 116 to alert them that a different target torque value has been set for a particular object, tubular member, tool, and/or joint in a string of tubular members, for example. For example, should a particular object, tool, or tubing string require one or more different target torque values for making up the object, tool string, etc. torque measuring vise and notification system 100 may provide a different notifier to user 116 so that they are aware of the different target torque values set. FIG. 12 further provides additional description regarding repetition rates of notifiers.

Figure 13:
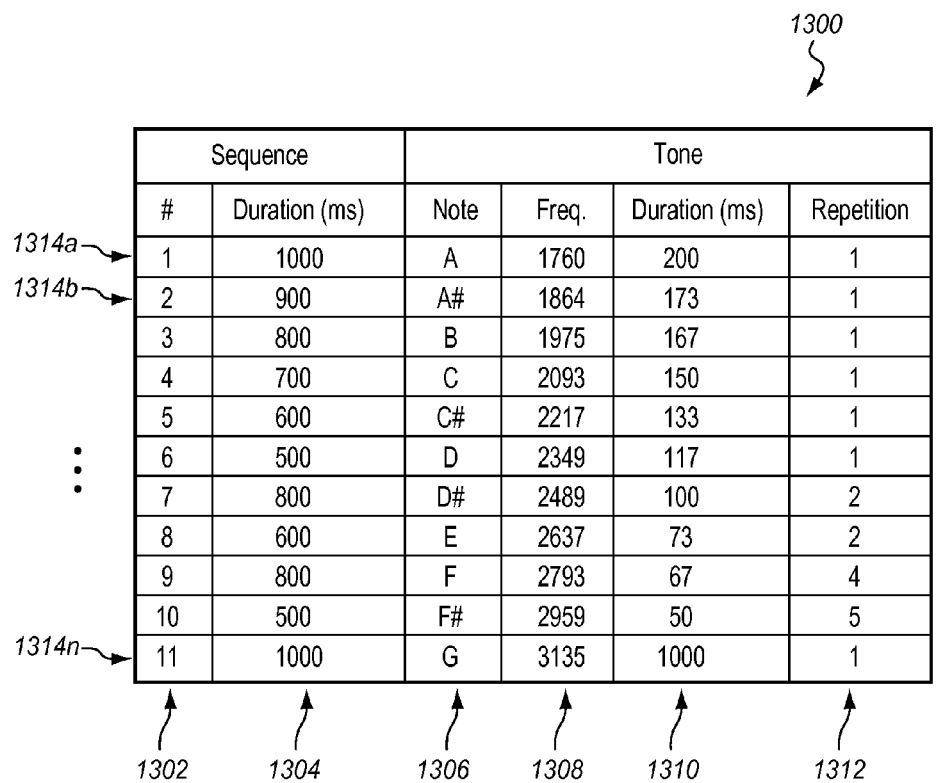
FIG. 13 is exemplary tabular representation of different tones and repetition rates of notifiers of the torque measuring vise and notification system according to an embodiment.
Figure 14:
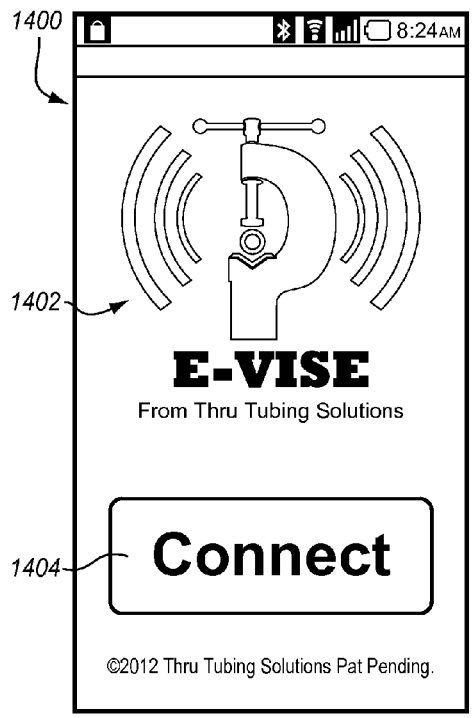
FIG. 14 is an exemplary screenshot of a graphical user interface ("GUI") for displaying wireless device startup functionality of the torque measuring vise and notification system according to an embodiment.

In one instance, target torque value 1102 "A" may have a value of 500 ft·lb that will have a corresponding notifier, such as an audible tone having a longer wavelength frequency for producing a lower tone or pitch to user 116. In so doing, user 116 understands that the lower tone or pitch of the notifier is associated with a lower target torque value. Additionally, target torque value 1102 "B" may have a value of 750 ft·lb that will have a corresponding notifier, such as an audible tone having a shorter wavelength frequency for producing a slightly higher tone or pitch to differentiate it from target torque value 1102 "A." In addition, target torque value 1102 "C" may have a value of 900 ft·lb that will have a corresponding notifier, such as an audible tone having an even shorter wavelength frequency for producing an even higher tone or pitch to differentiate it from target torque value 1102 "A" and "B." FIG. 13 provides additional description regarding notifier tones and/or pitches.

Torque measuring vise and notification system 100 may also provide a series of different tones at increasing repetition rates at different torque values less than the target torque value. For example, torque measuring vise and notification system 100 may provide a notifier at a first tone (vibration, visual, etc.) having an increasing repetition rate that is set to a first torque value, another notifier having a different tone (vibration, visual, etc.) having an increasing repetition rate that is set to a second torque value, and yet another notifier having yet another different tone (vibration, visual, etc.) having an increasing repetition rate that is set to a third torque value.

In this example, the final target torque value may be 1,500 ft·lb, but user 116 desires to be notified when the measured torque applied to an object secured in torque measuring vises 102, 300 has reached certain values less than the target torque value, such as at 500 ft·lb, 1,000 ft·lb, and then the target torque value of 1,500 ft, for example. Torque measuring vise and notification system 100 may provide a corresponding notifier, such as an audible tone having a first wavelength frequency (longer/shorter) for producing a lower tone or pitch to user 116. As the measured torque value goes from 0-500 ft·lb the repetition rate of the notifier increases as the measured torque value approaches 500 ft·lb, the repetition rate increase substantially finally ending in a constant tone at a particular wavelength frequency.

Next, as the measured torque value goes to 501 ft·lb a second tone having a different wavelength frequency than the first tone is presented to user 116 at a low repetition rate and as the measured torque value increases towards 999 ft·lb the repetition rate of the second tone increases accordingly. Once the 1,000 ft·lb is reached the second tone may be presented to user 116 as a constant tone, and not a beeping tone. Then as the measured torque value goes to 1,001 a third tone having yet a different wavelength frequency that the first and second tone is presented to user 116 at a low repetition rate and as the measured torque value increases towards 1,500 ft·lb the repetition rate of the third tone increases accordingly, finally ending with a constant tone once the target torque value of 1,500 ft·lb is reached.

In so doing, user 116 understands that the lower tone or pitch of the notifier is associated with a lower target torque value. Additionally, target torque value 1102 "B" may have a value of 750 ft·lb that will have a corresponding notifier, such as an audible tone having a shorter wavelength frequency for producing a slightly higher tone or pitch to differentiate it from target torque value 1102 "A." In addition, target torque value 1102 "C" may have a value of 900 ft·lb that will have a corresponding notifier, such as an audible tone having an even shorter wavelength frequency for producing an even higher tone or pitch to differentiate it from target torque value 1102 "A" and "B." FIG. 13 provides additional description regarding notifier tones and/or pitches.

Turning now to FIG. 12, an exemplary illustration of different wavelength frequencies of notifiers corresponding to different target torque values is schematically illustrated and generally designated 1200. Torque measuring vise and notification system 100 may or may not produce an idle tone 1202 notifier when torque measuring vises 102, 300 are idle. Once user 116 begins using torque measuring vises 102, 300, torque measuring vise and notification system 100 determines that torque measuring vises 102, 300 are being operated and may generate an initial repetition tone 1204. Torque measuring vise and notification system 100 may also generate a different notifier corresponding to a target torque value tone 1206 to notify user 116 that the target torque value has been reached. Between initial tone 1204 and target torque value tone 1206, torque measuring vise and notification system 100 may increase linearly and/or non-linearly a repetition rate for notifiers to notify user 116 that the measure torque value of torque measuring vises 102, 300 is approaching the set target torque value.

Referring now to FIG. 13, an exemplary illustration of different wavelength frequencies of notifiers corresponding to the proximity of the actual torque measurement to a set target torque value is schematically illustrated and generally designated 1300. Torque measuring vise and notification system 100 may use a plurality of different notifiers, such as tones 1314a-1314n, to notify user 116 of the proximity of the measured torque value to the set target torque value. For example, a notifier 1314a having idle tone 1202 may have a particular sequence number 1302, duration 1304, such as 1000 milliseconds. It may also have corresponding individual tone characteristics, such as a corresponding musical note 1306 ("A"), a particular wavelength frequency 1308 (1760 Hz), a particular duration 1310 (200 milliseconds), and a particular repetition rate 1312 (1).

In one embodiment, torque measuring vise and notification system 100 may include algorithms for determining which notifier to generate and its repetition rate. For example, torque measuring vise and notification system 100 plays notifiers that give an indication of the difference between the current torque measurements and target torque values. In one aspect, when the difference between the two is larger, tones, or any other notifier, may be lower in pitch, longer in duration, and are repeated less frequently. Conversely, when the difference between the two is smaller, tones may be higher in pitch, shorter in duration, and are repeated more often. FIG. 13 depicts an exemplary eleven combinations of pitch, duration, and repetition rate used to indicate the difference between the actual torque measurement to the target torque value.

In one embodiment, torque measuring vise and notification system 100 may have three states related to tone generation, idle tone 1202, initial repetition tone 1204, and target torque value tone 1206, as discussed above. The eleven music scale tones shown in FIG. 13 represent eleven consecutive tones from the chromatic music scale. A long series of identical tones is created by playing the same tone repeatedly; torque measuring vise and notification system 100 can then schedule the next tone sequence. In one embodiment, tone sequences may be selected for playback according to the formula: t=1; if T≥500 and t=10−[T/50]; if 0<T<500; where t is the tone sequence number that will be played, and T is the actual torque differential between target torque value and current torque measurement ($T=T_{target}-T_{actual}$). This formula provides operator feedback over a 500 ft·lb range with 50 ft·lb resolution.

Notifiers may be any type feedback and/or notifier such as aural, audible, vibratory, tactile, visual, and the like. The repetition rates and other characteristics described above applies as possible to all of these different notifier types. For example, as discussed above relating to an aural notifier, the repetition rates may apply to a tactile, vibratory, and/or visual notifier such that they emit their notification characteristics under the same or similar repetition rate, etc. schemes.

In one embodiment, torque measuring vises 102, 300 may be calibrated initially prior to their first use, and in another embodiment, torque measuring vises 102, 300 may be calibrated in the field, shop, and any time after their first use. Calibration of torque measuring vises 102, 300 should allow for the use of as much of sensor signal amplifier 706 converter range as possible considering the measurement range of torque measuring vises 102, 300 and the need for headroom to permit the detection of over-range and under-range conditions. Calibration must accommodate for the possibility of positive apparent strain at zero torque. This apparent strain can prevent the desired lower limit of sensor signal amplifier 706 range from being reached. Consequently, the usable range of the A/D converter is reduced. Small and negative apparent strain can be offset by sensor signal amplifier 706 offset adjustment, in one embodiment.

Calibration of sensor signal amplifier 706 requires the selection of gain and offset values that satisfy generally the following conditions: $70 \le G \le 1280$; $0 \le O \le 4080$; $A_{min} \le A \le A_{max}$; where T=torque applied to torque measuring vises 102, 300; $T_{max}$=maximum torque range of torque measuring vises 102, 300; A=sensor signal amplifier 706 measurement (0-4095); $A_0$=sensor signal amplifier 706 measurement at $T=T_0$, $G=G_0$, $O=0$, $A_{min}$=preferred minimum (zero torque) sensor signal amplifier 706 measurement (typ. 100); actual zero torque A may be higher if apparent strain at zero torque yields values higher than $A_{min}$. $A_{max}$=preferred maximum torque sensor signal amplifier 706 measurement (typ. 4000); G=sensor signal amplifier 706 gain (70≤G≤1280); $G_0$=minimum sensor signal amplifier 706 gain (70); O=sensor signal amplifier 706 offset (0≤O≤255); $O_1$=sensor signal amplifier 706 offset (0≤$O_1$≤255) that provides the desired zero strain A value at $G_0$.

In one embodiment, the calibration algorithm may be as follows. Step 1: Determine $O_1$=O at T=0 and G=$G_0$ such that A=$A_{min}$ or O=0, which ever value of O is higher (i.e. $O_1$ cannot be negative). Step 2: Measure $Z_0$=A at G=$G_0$, T=0, and O=$O_1$. Step 3: Determine $G_1$=G at T=$T_{max}$ and O=$O_0$ such that A=$A_{max}$. Step 4: Compute $Z_1$=($Z_0$−16·$O_1$) $G_1$/$G_0$. This is the zero torque value of A at O=$O_1$ and G=$G_1$. Step 5: Compute $R_0$=$A_{max}$−$Z_1$. This is the range of A as T ranges from 0 to $T_{max}$. Step 6: Compute $G_2$=($A_{max}$−$A_{min}$)/$R_0$·$G_1$. This is the gain that will normalize the range of A.

Step 7: Compute $Z_2$=($Z_0$−16)·$O_1$)$G_2$/$G_0$. This is the zero torque value of A at O=$O_1$ and G=$G_2$. Step 8: Compute $O_2$=($A_{min}$−Z)/16. This is the offset to place zero torque in the desired location when G=$G_2$. Step 9: If $O_2$≥0 use $O_2$ and $G_2$ for calibration. Otherwise, continue with step 10. Step 10: Determine $G'_2$=G at T=$T_{max}$ and O=0 such that A=$A_{max}$. Step 11: Use gain $G'_2$ and offset 0 for calibration. The implementation of calibration step 1 requires that the value of $O_1$ be determined. Rather than attempt to compute this value directly, a search algorithm may be used to experimentally determine $O_1$ by taking measurements as O is adjusted over its range. Changing the value of O changes the parameters of the analog signal conditioning system. Some time may be needed to ensure that the data acquisition system reaches a stable state after each change to O.

This includes the digital filtering performed in software 604. Software filters may have a settling time on the order of 1 second, for example. Waiting for this period of time after each experimental test of O causes a very slow calibration sequence. To further speed the implementation of this step, the search algorithm is binary, such that the worst case performance requires approximately $\log_2$ (256) experimental evaluations of O.

The implementation of calibration step 3 may require the determination of gain $G_1$. Gain g2 may be a coarse gain adjustment that may be selected from a table stored in databases 612a, 612b, for example. Gain g1 may provide fine gain adjustment and can be computed from a formula using an exponential or by table lookup. The algorithm selected for this step begins by setting g1 to its minimum value of 4, for example. A binary search algorithm is used to experimentally determine the value of g2 (using values from a table in memory 606, storage 610 and/or databases 612a, 612b) that may provide the highest value of g2 such that A<$A_{max}$. With this value selected for g2, a second binary search algorithm experimentally determines the value of g1, selecting possible values from a table in memory. The value chosen for g1 is the largest value such that A≤$A_{max}$. As with step 1, software filters may be bypassed in this algorithm.

In one embodiment, an initial calibration may be performed prior to the first use of torque measuring vises 102, 300. In this embodiment, torque measuring vises 102, 300 may be placed in a zero torque state. Next, an "offset" button or selection may be displayed on wireless device 108 to user 116. Upon selecting the offset function, wireless device 108 performs steps 1 and 2 described above. Next, user 116 may apply maximum torque with torque applying device 106 to an object secured in torque measuring vises 102, 300. Maximum torque may include securing an object, such as a tubular member, in torque measuring vises 102, 300 and then connecting torque applying device 106 to the object and applying a known torque standard that may be set at the maximum torque of torque measuring vises 102, 300 or some other torque standard that is less than the maximum torque value of torque measuring vises 102, 300.

Next a "gain" button or selection may be displayed to user 116. By selecting the gain button, the remaining calibration steps described above may be performed by wireless device 108. After the initial front end calibration, the parameters needed to configure the analog signal conditioning system have been computed and stored in memory 606. In one aspect, the initial calibration does not need to be repeated unless the physical properties of the vise have been altered, such as might be caused by over stress or over-torquing of torque measuring vises 102, 300. In one aspect, after the initial calibration, a "zero" and "normal calibration" procedure, which do not change the parameters of the analog sub-system, may need to be performed after the initial calibration procedure described above.

In one embodiment, zeroing torque measuring vises 102, 300 may be performed in the following manner. In doing so, they can be set to compensate for temperature and other short term errors. With zero torque applied to torque measuring vises 102, 300, wireless device 108 sends a command to torque measuring vises 102, 300 that they be set to zero. Torque measuring vises 102, 300 records the torque reading (with normal software filtering enabled) to non-volatile memory. This is the zero torque offset. All future torque readings will be adjusted by this amount.

In one embodiment, a later calibration, such as a fine or normal calibration may be performed on torque measuring vises 102, 300 subsequent to the initial calibration operation. This later calibration operation may be performed to compensate for the effects of aging of torque measuring vises 102, 300. Prior to performing this fine calibration, torque measuring vises 102, 300 should be zeroed as described above prior to performing calibration.

After it has been zeroed, a known torque, such as 800 ft·lb for example, is applied by torque applying device 106 to an object secured in torque measuring vises 102, 300. Wireless device 108 commands or instructs torque measuring vises 102, 300 to calibrate to this torque value. Strain gages 222 are read normally (i.e. with software filtering enabled). Zero torque strain is subtracted from this measured torque value. In one embodiment, a scale factor may be computed by the formula: f=T/(S−z); where f is the scale factor, T is the applied torque, and S is the strain measurement from strain gages 222 with the known torque applied to torque measuring vises 102, 300, and z is the zero torque offset. f is stored in non-volatile storage. Future torque readings will be scaled by f.

For performing a calibrated torque computation, the following procedure may be used. The formula for computing torque using the calibration values here is: T=f(S−z); where T is the measured torque, S is the strain measurement, z is the zero torque offset, and f is the calibration factor.

Additional parameters and information relating to calibrating torque measuring vises 102, 300 may also be inputted into torque measuring vise and notification system 100. For example, calibrating torque measuring vises 102, 300 may require the outer diameter of the known torque standard that torque measuring vises 102, 300 is engaged with during calibration for further refining the calibration of torque measuring vises 102, 300. In one embodiment, user 116 may enter the outer diameter value into torque measuring vise and notification system 100.

Additionally, voltage sensitivity or calibration may also need to be taken into account when calibrating torque measuring vises 102, 300. Voltage reading from power unit 218 and/or batteries 220 may be transmitted to wireless device 108 for determining further calibration compensation, that may then be transmitted back to torque measuring vises 102, 300 for computing when computing torque measurements of torque measuring vises 102, 300 prior to transmitting them to wireless device 108.

Turning now to FIGS. 14-29, they include many different exemplary screen shots of GUIs (corresponding GUIs 1400-2900) that may be displayed to user 116 during operation of torque measuring vise and notification system 100. Some or all of these GUIs may or may not be presented to a particular user 116 depending on the operation of torque measuring vises 102, 300 and/or wireless device 108. GUI 1400 may be displayed on one or more of wireless device 108 and computing devices 110, 112, for example. It may display a startup screen 1402 for use by user 116. It may also display a connect button 1404 for operating by user 116 to start a scanning and pairing operation for available torque measuring vises 102, 300. GUI 1400 may be displayed to a user 116 for selecting an application start button or selection displayed on wireless device 108.

Figure 15:
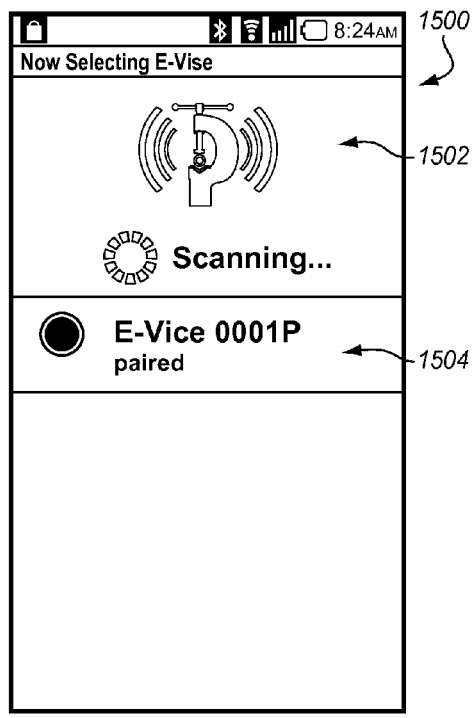
FIG. 15 is an exemplary screen shot of a GUI for displaying scanning activity between a wireless device and a torque measuring vise of the torque measuring vise and notification system according to an embodiment.
Figure 16:
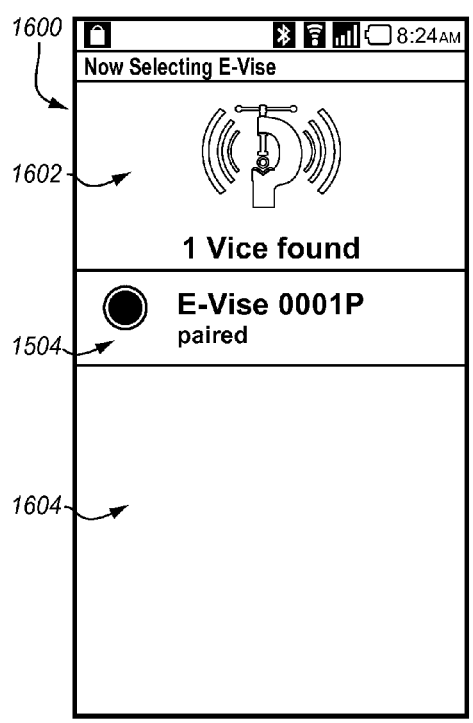
FIG. 16 is an exemplary screenshot of a GUI for displaying available torque measuring vises of torque measuring vise and notification system according to an embodiment.
Figure 17:
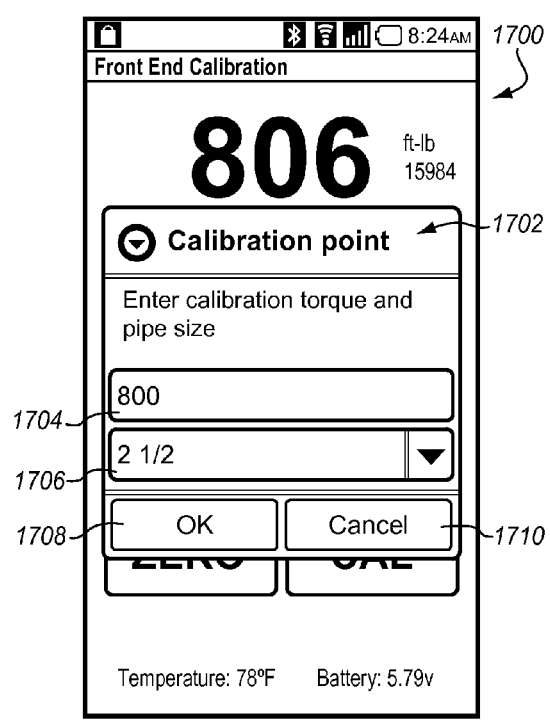
FIG. 17 is an exemplary screenshot of a GUI for displaying initial torque measuring vise calibration functionality of the torque measuring vise and notification system according to an embodiment.
Figure 18:
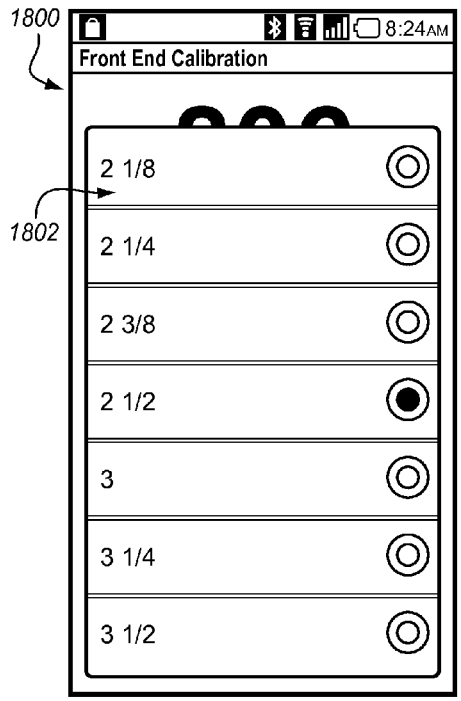
FIG. 18 is another exemplary screenshot of a GUI for displaying initial torque measuring vise calibration functionality of the torque measuring vise and notification system according to an embodiment.
Figure 19:
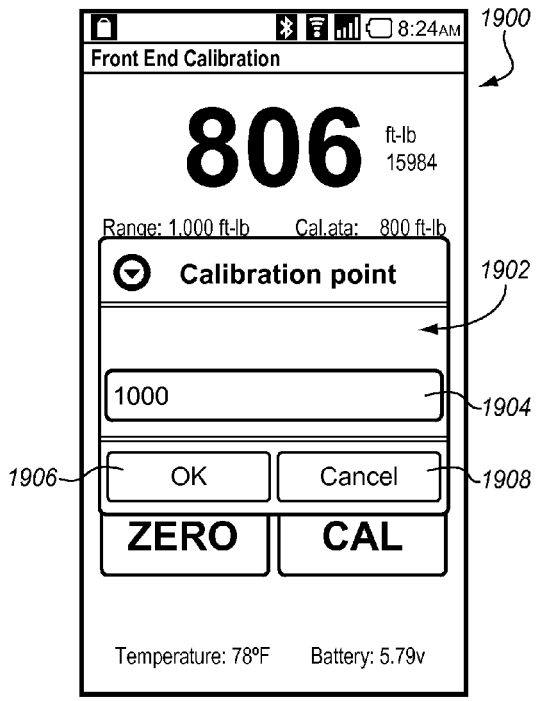
FIG. 19 is another exemplary screenshot of a GUI for displaying initial torque measuring vise calibration functionality of the torque measuring vise and notification system according to an embodiment.

Referring now to FIG. 15, an exemplary screenshot of a GUI for displaying scanning operations of torque measuring vise and notification system 100 is schematically illustrated and generally designated 1500. GUI 1500 may display a scanning status 1502 and a torque measuring vise paired status 1504 to user 116. Torque measuring vise paired status 1504 displays a preferable torque measuring vises 102, 300 for communicating with wireless device 108. GUI 1500 may be displayed by selecting button 1404. GUI 1600 of FIG. 16 may also be displayed to user 116 that may display 1602 those torque measuring vises 102, 300 that were found and paired. Additionally, GUI 1600 may display any other found torque measuring vises 102, 300 in portion 1604 of GUI 1600, in one aspect. In one embodiment, GUI 1600 may be displayed automatically after GUI finishes searching and pairing with torque measuring vises 102, 300. GUI 1700 displays a calibration point menu 1702 for entering a calibration torque value in field 1704. This value may be entered via a virtual keyboard displayed to user 116 or it may be entered by clicking on a drop down menu that list several different calibration torque values. An alternative to displaying a virtual keyboard, wireless device 108 may display a touch-screen wheel similar to many popular MP3 music players may be used to adjust the target torque value to the desired target value. GUI 1700 may be displayed to user 116 by selecting Cal button 2010 (FIG. 20) and/or Cal button 2306 (FIG. 23).

Calibration point menu 1702 may also include an outer diameter field 1706 for entering the outer diameter of the known torque standard for calibrating torque measuring vises 102, 300. Calibration point menu 1702 may further include an "OK" button or selection 1708 for accepting the displayed target torque value and outer diameter displayed in calibration point menu 1702. Calibration point menu 1702 may also include a "Cancel" button or selection 1710 if user 116 desires to cancel calibration point menu functionality.

GUI 1800 may display a list of different outer diameter sizes 1802 for the known calibration standard that may be displayed when target torque value field 1704 may been selected. User 116 may selected any of the displayed outer diameter sizes by clicking in one of the button shown to the right of each size, in one embodiment. In one aspect, once a particular outer diameter size has been selected by user 116, outer diameter sizes 1802 may close and the GUI may return to GUI 1700, for example. In one embodiment, GUI 1800 may be displayed to user 116 by selecting an outer diameter size in the outer diameter field 1706.

Figure 20:
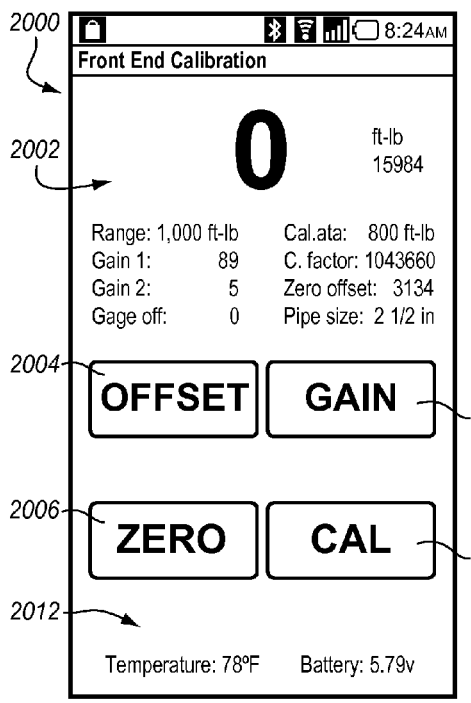
FIG. 20 is another exemplary screenshot of a GUI for displaying initial torque measuring vise calibration functionality of the torque measuring vise and notification system according to an embodiment.
Figure 21:
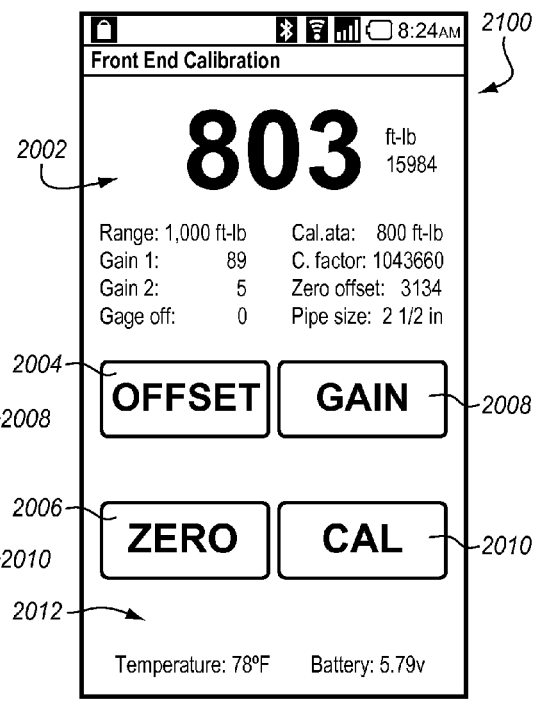
FIG. 21 is another exemplary screenshot of a GUI for displaying initial torque measuring vise calibration functionality of the torque measuring vise and notification system according to an embodiment.
Figure 26:
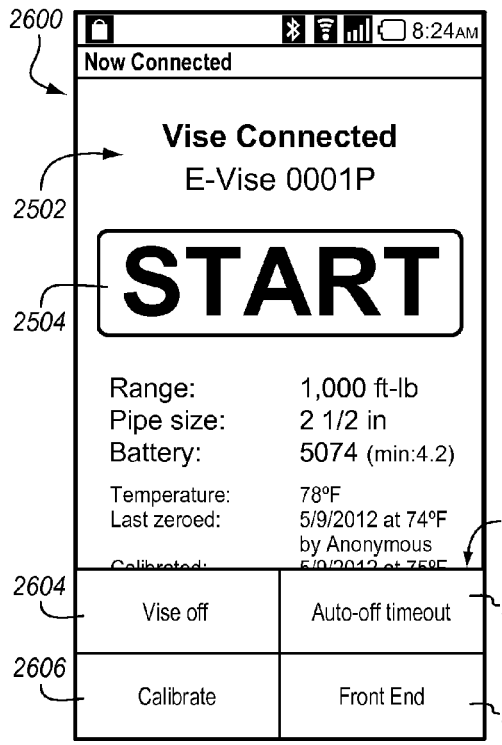
FIG. 26 is another exemplary screenshot of a GUI for displaying torque measuring vise operation of the torque measuring vise and notification system according to an embodiment.
Figure 27:
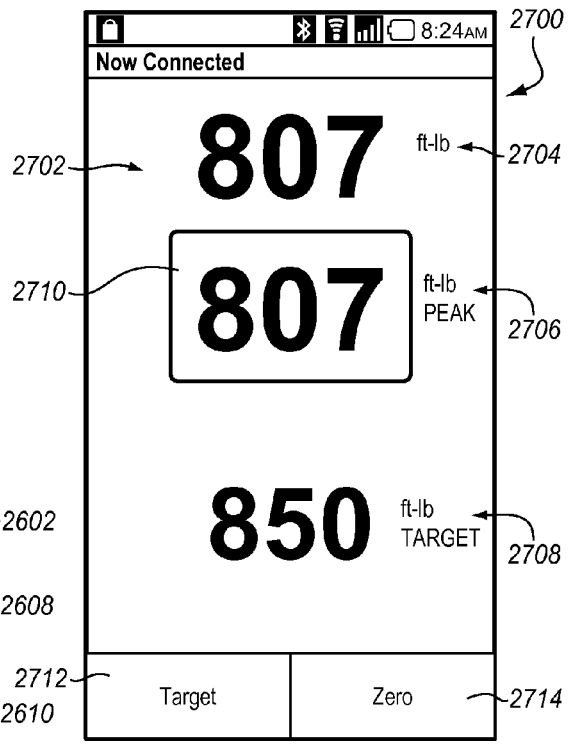
FIG. 27 is another exemplary screenshot of a GUI for displaying torque measuring vise operation of the torque measuring vise and notification system according to an embodiment.
Figure 28:
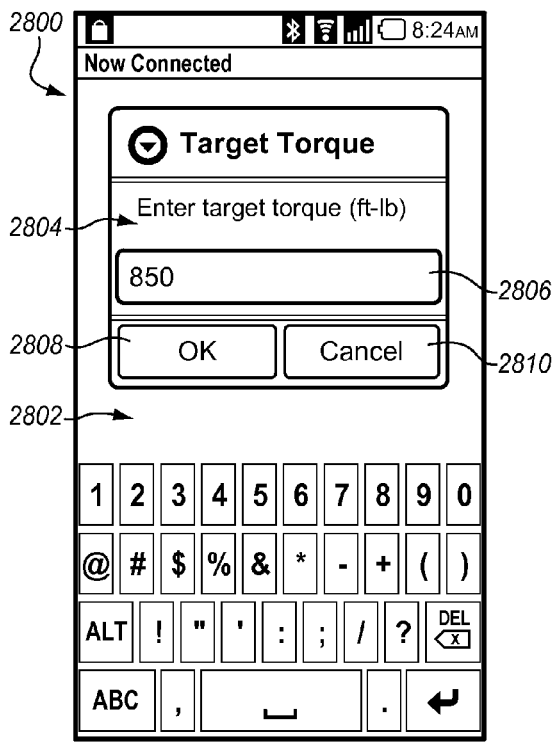
FIG. 28 is another exemplary screenshot of a GUI for displaying torque measuring vise operation of the torque measuring vise and notification system according to an embodiment.

GUI 1900 may display a field for entering the calibration torque value 1902 that may be displayed in response to selecting Gain button 2008 (FIG. 20). A calibration torque value may be inputted in field 1904 with a virtual keyboard displayed to user 116 or by a drop down menu as is commonly known to those skilled in the art. Calibration point menu 1902 may further include an "OK" button or selection 1906 for accepting the displayed target torque value and outer diameter displayed in calibration point menu 1902. Calibration point menu 1902 may also include a "Cancel" button or selection 1910 if user 116 desires to cancel calibration point menu functionality. GUI 1900 may be displayed to user 116 by selecting Gain button 2008 (FIG. 20), in one example.

GUIs 2000 and 2100 displays a display screen 2002 that may include information or data relating to actual torque measurement, range ft-lb, gain 1, gain 2, gage off, cal. ata, zero offset, pipe size, etc. Additionally, they may include an "Offset" button 2004, "Zero" button 2006, "Gain" button 2008, and a calibration "Cal" button 2010. By selecting Offset button 2004 an offset function relating to calibrating torque measuring vises 102, 300 as described herein may be performed. Similarly, by selecting Zero button 2006 a zero function relating to calibrating torque measuring vises 102, 300 as described herein may be performed. Also, by selecting Gain button 2008 a gain may be determined at a particular torque for calibrating torque measuring vises 102, 300 as described herein. GUIs 2000 and 2100 may be displayed to user 116 by selecting Front end button 2610 (FIG. 26), in one example.

GUI 2200 may be displayed when a menu button on wireless device 108 is selected by user 116. In another aspect, GUI 2000 may be displayed by selecting a menu button on GUI 2000. GUI 2200 may include a menu 2202 of functions relating to calibrating torque measuring vises 102, 300. For example, menu 2202 may display a "Calibrate battery" button 2204, "Reset NV" button 2206, "Calibrate Vref" button 2208, and a "Dev Prop" button 2210.

GUI 2300 displays a display 2302 that may include a current torque measurement or calibration torque measurement. Additionally, GUI 2300 may include a "Zero" button 2304 and a "Cal" button 2306. By selecting Zero button 2006 a zero function relating to calibrating torque measuring vises 102, 300 as described herein may be performed. By selecting Cal button 2306 a calibration function or display relating to calibrating torque measuring vises 102, 300 as described herein may be performed or displayed. This particular calibration may be related to the normal or fine calibration operations and not the initial calibration operations as described herein. In one example, GUI 2300 may be displayed to user 116 when the Calibrate button 2606 (FIG. 26) is selected.

GUI 2400 may be displayed when the Cal button 2306 is selected by user 116. Part of the GUI 2400 display may also include calibration point menu 1702 for entering calibration torque values and outer diameter sizes. After torque measuring vises 102, 300 has been calibrated, user 116 may be displayed a torque measurement home GUI 2500. GUI 2500 may display a home page display 2502 including information or data relating to type of torque measuring vises 102, 300, range, pipe size, battery, temperature, last zeroed, calibrated, media access control ("MAC") address, serial number, hardware version, and firmware version, for example. Additionally, GUI 2500 may display a "Start" button 2504 for starting the torque measurement and notification process with torque measuring vises 102, 300. In one example, GUI 2400 may be displayed to user 116 by selecting Cal button 2010 and/or Cal button 2306. In one instance, GUI 2500 may be displayed to user 116 by selecting "wrench" from the list displayed on torque applying device paired status 1504.

GUI 2600 may display a menu 2602 that may include a "Wrench off" button 2604, "Calibrate" button 2606, "Auto-off timeout" button 2608, and "Front end" button 2610 for presenting additional functions and operations to user 116. By selecting Wrench off button 2604 user 116 may turn off torque measuring vises 102, 300 manually without waiting on the auto-off timeout function to operate. By selecting Calibrate button 2606, the normal or fine calibration GUI as described herein may be displayed to user 116. Additionally, should user 116 or another user desire to perform the front end or initial calibration operation, by selecting Front end button 2610 the initial calibration GUIs may be displayed to user 116. In one instance, GUI 2600 may be displayed to user 116 by selecting a menu button displayed on GUI 2500.

Figure 29:
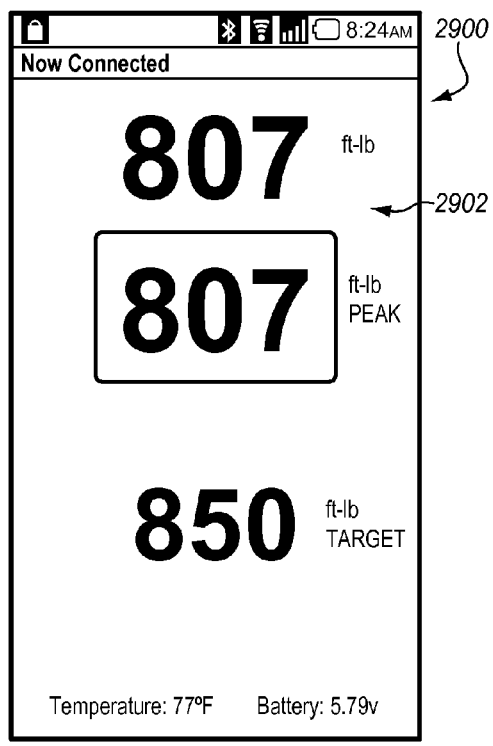
FIG. 29 is another exemplary screenshot of a GUI for displaying torque measuring vise operation of the torque measuring vise and notification system according to an embodiment.

GUIs 2700 and 2900 display to user 116 several different torque measurement or values as described herein. For example display 2702 may include an actual torque measurement 2704 that displays the actual torque measurement of torque measuring vises 102, 300 during operation. Further, display 2702 may include a peak torque measurement 2706 that displays the largest or peak torque measurement acquired during an operation of torque measuring vises 102, 300. Also, display 2702 may include a target torque value 2708 that is the set target torque value that is the target for reaching during a particular torque operation by torque measuring vises 102, 300. In one instance, GUI 2700 may be displayed to user 116 by selecting a menu button displayed on GUI 2900 (FIG. 29). In one example, GUI 2900 may be displayed to user 116 by selecting start button 2504.

GUI 2700 may include a display of the peak torque measurement button 2710 that corresponds to the highest actual torque measurement that has occurred during the torquing operation. As shown, peak torque measurement button 2710 may also serve a dual role as an active button to be selected by user 116 for resetting the actual torque measurement and/or peak torque measurement during any measuring operation. By having this dual functionality, user 116 may be wearing gloves during operation of torque measuring vises 102, 300 and still be able to activate the good sized peak torque measurement button 2710, such as by tapping his pocket to activate peak torque measurement button 2710. In one embodiment, peak torque measurement button 2710 has a black background with a white box for displaying black readout peak torque measurements.

In addition, wireless device 108 may recognize a gesture of some type by user 116 for resetting wireless device 108 during a torque measuring operation. The gesture allows user 116 to make a gesture that wireless device 108 recognizes that user 116 wants to zero wireless device 108. Additionally, such gestures may be recognized by wireless device 108 that user 116 desires to zero wireless device 108, for example. Further, another gesture may be recognized by wireless device 108 that user 116 is finished with the applying torque and measuring torque; and to instruct wireless device 108 to transmit the torque measurements/data to wherever it is desired to be sent.

In another embodiment, wireless device 108 may be programmed such that user 116 may apply torque to torque measuring vises 102, 300 to reach a target torque value, and once reached user 116 may contact or touch wireless device 108 to instruct it to set to the next target torque values and parameters for the next object, tubular member, etc. in a pipe or tool string that user 116 may be assembling. This provides a continuous operation and a excellent data record of sequential torquing operations for a sequence of objects and carefully documents what occurred and when and by whom.

In yet another embodiment, wireless device 108 may be set in an automatic mode where once a target torque value has been reached, wireless device 108 automatically resets for the next object, tubular member, etc. to be assembled by user 116. In this embodiment, user 116 may continue operating torque measuring vises 102, 300 until they are notified that the target torque value has been reached and then they can uncouple an object, tubular member, etc. from torque measuring vises 102, 300 reconnect to the next object in the tool or pipe string, for example.

Further, GUI 2700 may include a "Target" button 2712 and a "Zero" button 2714. By selecting the Zero button 2714, the zero operation as described herein may be performed. By selecting the Target button 2712, user 116 may be presented with a Target torque input field 2804 as shown with GUI 2800. Target torque input field 2804 may further include a Target torque value 2806 for inputting the target torque value as described herein. Additionally, Target torque input field 2804 may also include an "OK" button 2808 for accepting inputted target torque value and a "Cancel" button 2810 for canceling the target torque value input operation. GUI 2800 may also include a virtual keyboard for entering information and data by user 116, for example. In one instance, GUI 2800 may be displayed to user 116 by selecting peak torque measurement button 2710 and then selecting Target torque value 2806 to bring up virtual keyboard.

Figure 30:
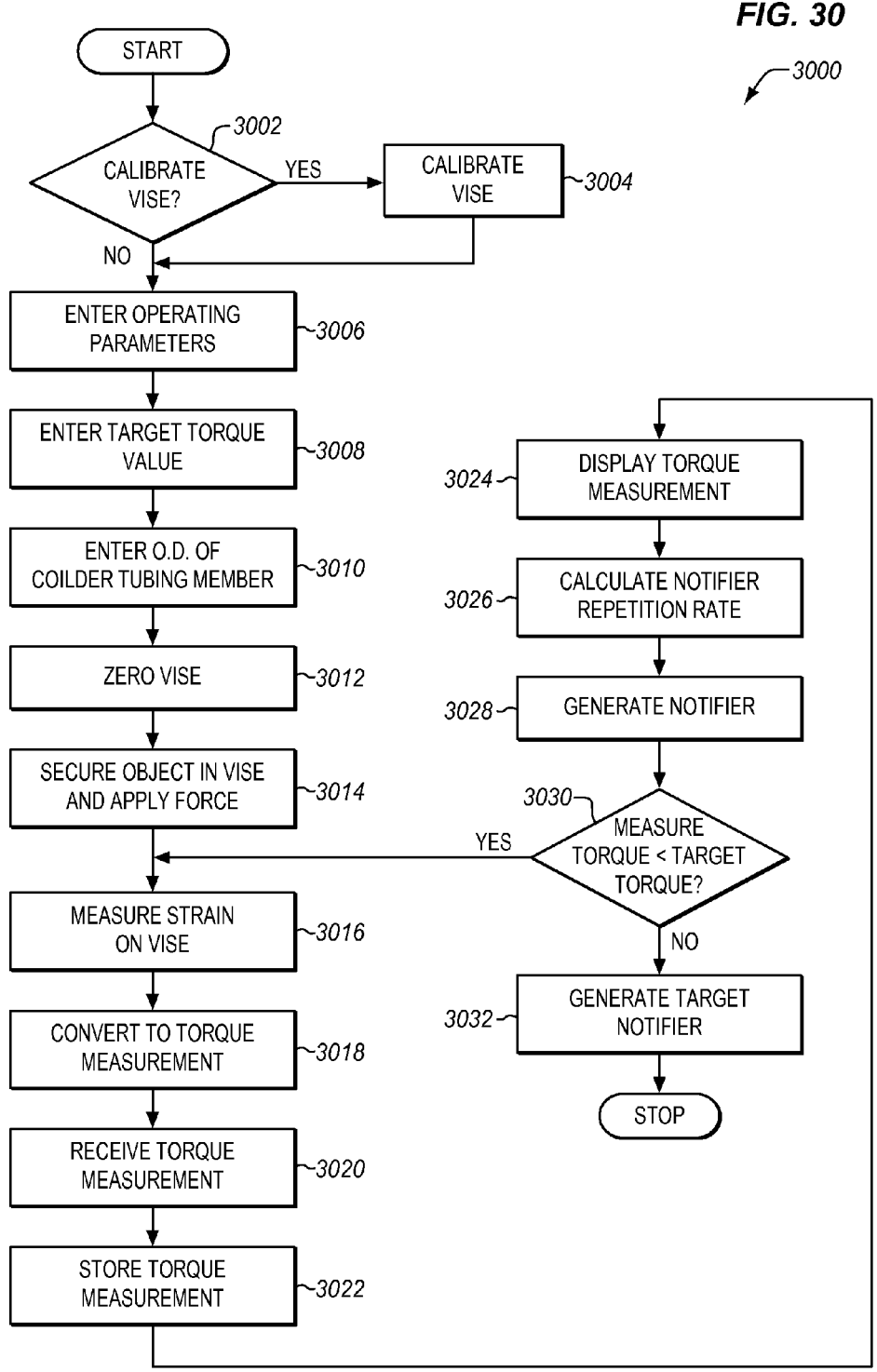
FIG. 30 is a flowchart of a process for measuring and notifying torque measurements by a torque measuring vise of the torque measuring vise and notification system to a user according to an embodiment.

Torque measuring vise and notification system 100 further includes methods for measuring torque applied to an object, tubular member, etc., for example, and notifying a user 116 of the proximity of the actual torque measurement to a set target torque value. With reference to FIG. 30, an embodiment of a method for measuring actual torque applied by torque applying device 106 to an object, such as tubular member 104, secured in torque measuring vises 102, 300, for example, is schematically and generally designated 3000. Prior to any of the steps noted below, user 116 may power on torque measuring vises 102, 300 by any of the ways described herein. In one example, power switch 734 is operated to power on torque measuring vises 102, 300. In step 3002, a query is made regarding whether torque measuring vises 102, 300 are to be calibrated prior to taking actual torque measurements. If the answer to this query is yes, then in step 3004 a calibration operation is performed on torque measuring vises 102, 300 as described herein. After calibration, the process may proceed to step 3006. If the answer to query is no, then the process proceeds to step 3006, which may be a step where user 116 enters certain parameters relating to the torque operation. This step may also include displaying found and/or paired torque measuring vises 102, 300. If more than one torque measuring vises 102, 300 are found during the scan, user 116 may be prompted to select one of torque measuring vises 102, 300 for operating with wireless device 108.

Step 3008 may include inputting a target torque value that is the goal or target to reach during the torque operation on an object secured in torque measuring vises 102, 300, for example. Step 3010 may include inputting the outer diameter size of tubular member either manually by user 116, in one instance. Step 3012 may include zeroing torque measuring vises 102, 300 as described herein prior to applying torque to an object secured in torque measuring vises 102, 300.

Step 3014 may include securely clamping an object, such as tubular member 104, in torque measuring vises 102, 300, securing torque applying device 106 to the object, and applying torque with torque applying device 106 to the object. In Step 3016, wireless device 108 measures the strain on post 216 torque measuring vises 102, 300 via strain gages 222. In step 3018, wireless device 108 converts the strain measurements to engineering torque measurements. In step 3020, user 116 may activate start button 2504 to instruct wireless device 108 to begin receiving torque measurements from torque measuring vises 102, 300. A stream of torque measurements are transmitted to wireless device 108 during this step from torque measuring vises 102, 300. In another embodiment, this step may include strain measurements being transmitted from torque measuring vises 102, 300 to wireless device 108 for converting to torque measurements. In one embodiment, these torque measurements are sent at a rate of approximately four times a second.

In another embodiment, wireless device 108 may be displayed a "collect" data button (not shown). By selecting this button, wireless device 108 would obviate all of the extraneous data that may be collected during the torquing operation that really doesn't mean much. Thus, user 116 may determine when and at what time the actual torque measurements are collected by wireless device 108, so that all of the extraneous ones may not be transmitted, thus freeing up storage and bandwidth, in one example.

In step 3022, wireless device 108 may store all of the received torque data and in step 3024, wireless device 108 may display the actual torque measurements and peak torque measurements as described herein. In step 3026, wireless device 108 calculates the proximity of the actual torque measurement and/or peak torque measurement to the target torque value and calculates a repetition rate for a particular notifier as described herein.

In step 3028, wireless device 108 may provide the generated notifier to user 116 via any means described herein including aural notifiers, audible notifiers, vibratory notifiers, tactile notifiers, visual notifiers, voice notifiers, etc. at a repetition rate to notify user 116 of the proximity of the actual torque measurement to the target torque value. These notifiers may be provided to user 116 via any known means including, earbuds, headphones, speakers, wireless device speakers, wireless headsets, Bluetooth headsets, Bluetooth earbuds, vibrations, tactile actions, lights, vocal commands, etc.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A torque measuring vise and notification system, comprising:
   a torque measuring vise adapted for securing to a surface, the torque measuring vise defining a clamping axis for releasably securing an object immobile, the torque measuring vise comprising:
     one or more sensors disposed about a support member of the torque measuring vise to produce one or more load responsive measurements of the support member during the application of torque to the object;
     an electronic circuit to receive the one or more load responsive measurements and to transmit at least one of the group consisting of the one or more load responsive measurements and one or more torque measurements; and
   a receiving device operable to communicate with the torque measuring vise, the receiving device having a means for receiving at least one of the group consisting of the one or more load responsive measurements and the one or more torque measurements.

2. The torque measuring vise and notification system as recited in claim 1, wherein the one or more sensors are disposed about the support member at substantially equal distances from each other.

3. The torque measuring vise and notification system as recited in claim 1, wherein the one or more sensors are disposed about the support member at substantially non-equal distances from each other.

4. The torque measuring vise and notification system as recited in claim 1, further comprising:
   a Wheatstone bridge in communication with the one or more sensors.

5. The torque measuring vise and notification system as recited in claim 1, wherein the torque measuring vise and the receiving device communicate wirelessly.

6. The torque measuring vise and notification system as recited in claim 1, wherein the torque measuring vise and the receiving device communicate via a wired connection.

7. The torque measuring vise and notification system as recited in claim 1, wherein the electronic circuit stores algorithms to determine a repetition rate of the notifier based on the proximity of the one or more torque measurements to a target torque value.

8. The torque measuring vise and notification system as recited in claim 1, wherein the electronic circuit converts the one or more load responsive measurements to the one or more torque measurements.

9. A torque measuring vise adapted for securing to a surface, the torque measuring vise for releasably securing an object immobile, comprising:
   a body for operatively supporting one or more movable clamping members defining a clamping axis;
   one or more sensors disposed on a support member connected to the body to produce one or more load responsive measurements of the torque measuring vise; and
   an electronic circuit to receive the one or more load responsive measurements and to transmit at least one of the group consisting of the one or more load responsive measurements and one or more torque measurements.

10. The torque measuring vise as recited in claim 9, wherein the one or more sensors are disposed about the body at substantially equal distances from each other.

11. The torque measuring vise as recited in claim 9, wherein the one or more sensors are disposed about the body at substantially non-equal distances from each other.

12. The torque measuring vise as recited in claim 9, wherein the one or more sensors comprises:
   one or more upper sensors disposed about the support member above one or more lower sensors disposed about the support member.

13. The torque measuring vise as recited in claim 9, further comprising:
   wired means for transmitting at least one of the group consisting of the one or more of the load responsive measurements and the one or more torque measurements.

14. The torque measuring vise as recited in claim 9, further comprising:

wireless means for transmitting at least one of the group consisting of the one or more of the load responsive measurements and the one or more torque measurements.

15. The torque measuring vise as recited in claim 9, wherein the one or more sensors measure at least one of compression and tension of the support member along an axis approximately 90 degrees from the clamping axis of the torque measuring vise during application of torque to the object.

16. The torque measuring vise as recited in claim 9, wherein the one or more sensors measure at least one of compression and tension of the support member along an axis between approximately 90 degrees and 0 degrees from the clamping axis of the torque measuring vise during application of torque to the object.

17. A torque measuring vise and notification system, comprising:
   a torque measuring vise adapted for securing to a surface, the torque measuring vise having a support member for supporting substantially opposing clamping members defining a clamping axis for releasably securing an object immobile, the torque measuring vise comprising:
      one or more strain gages disposed on the support member to produce one or more load responsive measurements of the support member during the application of torque to the object;
      an electronic circuit to receive the one or more load responsive measurements, and to transmit at least one of the group consisting of the one or more load responsive measurements and one or more torque measurements;
   a receiving device operable to communicate with the torque measuring vise, the receiving device having a database to store a target torque value and to receive the at least one of the group consisting of the one or more load responsive measurements and one or more torque measurements; and
   at least one computing device to communicate with the receiving device to receive and store the target torque value and the one or more torque measurements.

18. The torque measuring vise and notification system as recited in claim 17, wherein the one or more sensors are disposed about the body at substantially equal distances from each other.

19. The torque measuring vise and notification system as recited in claim 17, wherein the one or more sensors are disposed about the body at substantially non-equal distances from each other.

20. The torque measuring vise and notification system as recited in claim 17, further comprising:
   a Wheatstone bridge in communication with the one or more sensors.

21. The torque measuring vise and notification system as recited in claim 17, wherein the torque measuring vise and the receiving device communicate wirelessly.

22. The torque measuring vise and notification system as recited in claim 17, wherein the electronic circuit stores algorithms to determine a repetition rate of the notifier based on the proximity of the one or more torque measurements and the target torque value.

23. The torque measuring vise and notification system as recited in claim 17, wherein the electronic circuit converts the one or more load responsive measurements to the one or more torque measurements.

24. A torque measuring vise adapted for securing to a surface, comprising:
   a body for operatively supporting one or more movable clamping members defining a clamping axis for releasably securing an object immobile;
   one or more sensors disposed about the torque measuring vise; and
   an electronic circuit in communication with the one or more sensors for producing one or more load responsive measurements.

25. The torque measuring vise as recited in claim 24, wherein the one or more sensors are disposed about the body at substantially equal distances from each other.

26. The torque measuring vise as recited in claim 25, wherein the one or more sensors are disposed about the body at substantially non-equal distances from each other.

27. The torque measuring vise as recited in claim 24, wherein the electronic circuit is in communication with a strain gage bridge.

28. The torque measuring vise as recited in claim 24, wherein the one or more sensors comprises:
   one or more upper sensors disposed about the support member above one or more lower sensors disposed about the support member.

29. The torque measuring vise as recited in claim 24, further comprising:
   wireless means for transmitting at least one of the group consisting of the one or more of the load responsive measurements and the one or more torque measurements.

30. The torque measuring vise as recited in claim 24, further comprising:
   wired means for transmitting at least one of the group consisting of the one or more of the load responsive measurements and the one or more torque measurements.

* * * * *